(12) United States Patent
Rothschild et al.

(10) Patent No.: US 9,124,911 B2
(45) Date of Patent: Sep. 1, 2015

(54) STORAGE OPTIMIZATION IN A CLOUD-ENABLED NETWORK-BASED DIGITAL VIDEO RECORDER

(71) Applicant: COX COMMUNICATIONS, INC., Atlanta, GA (US)

(72) Inventors: Keith Alan Rothschild, Dunwoody, GA (US); Slavisha Karach, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/800,617

(22) Filed: Mar. 13, 2013

(65) Prior Publication Data

US 2014/0237525 A1    Aug. 21, 2014

Related U.S. Application Data

(60) Provisional application No. 61/765,344, filed on Feb. 15, 2013.

(51) Int. Cl.
*H04N 7/173* (2011.01)
*H04N 21/236* (2011.01)
*H04N 21/2347* (2011.01)
*H04N 21/238* (2011.01)
*H04N 21/231* (2011.01)
*H04N 21/472* (2011.01)
*H04N 21/2747* (2011.01)
*H04N 21/266* (2011.01)
*H04N 21/845* (2011.01)

(52) U.S. Cl.
CPC ......... *H04N 21/236* (2013.01); *H04N 21/231* (2013.01); *H04N 21/2347* (2013.01); *H04N 21/23113* (2013.01); *H04N 21/23805* (2013.01); *H04N 21/26613* (2013.01); *H04N 21/2747* (2013.01); *H04N 21/47202* (2013.01); *H04N 21/8456* (2013.01)

(58) Field of Classification Search
CPC ........... H04N 21/231; H04N 21/2181; H04N 21/08549
USPC ....................................................... 725/145
See application file for complete search history.

(56) References Cited

U.S. PATENT DOCUMENTS

| | | | |
|---|---|---|---|
| 5,581,479 A * | 12/1996 | McLaughlin et al. | ........ 725/145 |
| 6,119,154 A | 9/2000 | Weaver et al. | |
| 6,816,904 B1 * | 11/2004 | Ludwig et al. | ................ 709/226 |
| 7,812,854 B1 | 10/2010 | Delker et al. | |
| 8,677,406 B2 | 3/2014 | Berkoff | |
| 8,893,194 B2 | 11/2014 | Baumgartner et al. | |
| 2002/0013948 A1 * | 1/2002 | Aguayo et al. | .................. 725/91 |
| 2002/0174430 A1 | 11/2002 | Ellis et al. | |
| 2002/0184637 A1 | 12/2002 | Perlman | |

(Continued)

*Primary Examiner* — Pankaj Kumar
*Assistant Examiner* — Timothy Newlin
(74) *Attorney, Agent, or Firm* — Sutherland Asbill & Brennan LLP

(57) ABSTRACT

This disclosure describes systems and methods related to cloud-enabled network-based digital video recording. In some embodiments, a request to copy a file to a plurality of target file locations may be received. A file may be retrieved and processed. The processing may include apportioning the file into a plurality of data blocks. At least one of the plurality of data blocks may be stored. A plurality of references pointers associated with each of the plurality of data blocks may be generated. The plurality of reference pointers may be stored to each of the plurality of file locations.

20 Claims, 10 Drawing Sheets

(56) References Cited

U.S. PATENT DOCUMENTS

| | | |
|---|---|---|
| 2003/0208763 A1 | 11/2003 | McElhatten et al. |
| 2006/0085821 A9 | 4/2006 | Simmons et al. |
| 2007/0124781 A1* | 5/2007 | Casey et al. ............... 725/94 |
| 2007/0226767 A1 | 9/2007 | Kaminski et al. |
| 2007/0250920 A1 | 10/2007 | Lindsay |
| 2008/0046930 A1 | 2/2008 | Smith et al. |
| 2008/0077942 A1 | 3/2008 | MacMillan et al. |
| 2008/0306871 A1 | 12/2008 | Grannan |
| 2009/0119716 A1 | 5/2009 | Ellis |
| 2009/0144765 A1 | 6/2009 | Branam |
| 2009/0169179 A1 | 7/2009 | Johnson |
| 2009/0222853 A1 | 9/2009 | White et al. |
| 2010/0036965 A1 | 2/2010 | Kim et al. |
| 2010/0040345 A1 | 2/2010 | Beach et al. |
| 2010/0086277 A1 | 4/2010 | Craner |
| 2010/0162367 A1 | 6/2010 | LaJoie et al. |
| 2010/0220976 A1 | 9/2010 | Ellis et al. |
| 2010/0319044 A1 | 12/2010 | Agans et al. |
| 2011/0016014 A1 | 1/2011 | Tonnison et al. |
| 2011/0040850 A1* | 2/2011 | Moromisato et al. ......... 709/213 |
| 2011/0249658 A1 | 10/2011 | Wohlert et al. |
| 2011/0276993 A1 | 11/2011 | Ferguson |
| 2011/0321100 A1 | 12/2011 | Tofighbakhsh |
| 2012/0159146 A1 | 6/2012 | Kamieniecki et al. |
| 2012/0180082 A1 | 7/2012 | Rothschild et al. |
| 2012/0210382 A1 | 8/2012 | Walker et al. |
| 2012/0266201 A1* | 10/2012 | Kanojia et al. ............... 725/109 |
| 2012/0284802 A1 | 11/2012 | Hierro et al. |
| 2012/0291104 A1 | 11/2012 | Hasek |
| 2012/0315021 A1 | 12/2012 | Schwesinger et al. |
| 2013/0064525 A1 | 3/2013 | Cary et al. |
| 2013/0114940 A1 | 5/2013 | Merzon et al. |
| 2013/0145410 A1* | 6/2013 | Major et al. ............... 725/109 |
| 2013/0275545 A1* | 10/2013 | Baptist et al. ............... 709/215 |
| 2013/0326572 A1* | 12/2013 | Pitts ............... 725/109 |
| 2014/0037270 A1 | 2/2014 | Graner |
| 2014/0040660 A1* | 2/2014 | Gladwin et al. ............... 714/6.2 |
| 2014/0082679 A1* | 3/2014 | Chan et al. ............... 725/92 |
| 2014/0181519 A1 | 6/2014 | Rao |
| 2014/0237505 A1 | 8/2014 | Rothschild et al. |
| 2014/0237520 A1 | 8/2014 | Rothschild et al. |
| 2014/0237521 A1 | 8/2014 | Rothschild et al. |
| 2014/0237522 A1 | 8/2014 | Rothschild et al. |
| 2014/0282918 A1 | 9/2014 | Rothschild et al. |
| 2014/0282982 A1 | 9/2014 | Rothschild et al. |
| 2014/0325221 A1 | 10/2014 | Rothschild et al. |

* cited by examiner

STORAGE OPTIMIZATION IN A CLOUD-ENABLED NETWORK-BASED DIGITAL VIDEO RECORDER

RELATED APPLICATIONS

This application claims priority to U.S. Provisional Patent Application No. 61/765,344, entitled "Cloud-Enabled Network-Based Digital Video Recorder," filed on Feb. 15, 2013, the contents of which are incorporated by reference herein in their entirety.

TECHNICAL FIELD

Aspects of the disclosure relate generally to digital video recorder functionality, and more particularly, to cloud-enabled network-based digital video recording.

BACKGROUND

Broadband service providers, such as cable service providers and satellite service providers, typically communicate broadband signals and/or other signals to customers in order to provide a wide variety of services, such as television service, telephone service, Internet service, etc. In conventional systems, a signal is communicated from a service provider to a set-top box (STB) situated within a customer's household. The signal is then processed by the STB in order to format data for presentation to the customer. Additionally, many conventional systems utilize digital video recorders (DVRs) to facilitate the recording of broadband content at the customer's direction. Conventional DVRs are typically situated within the customer's household.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
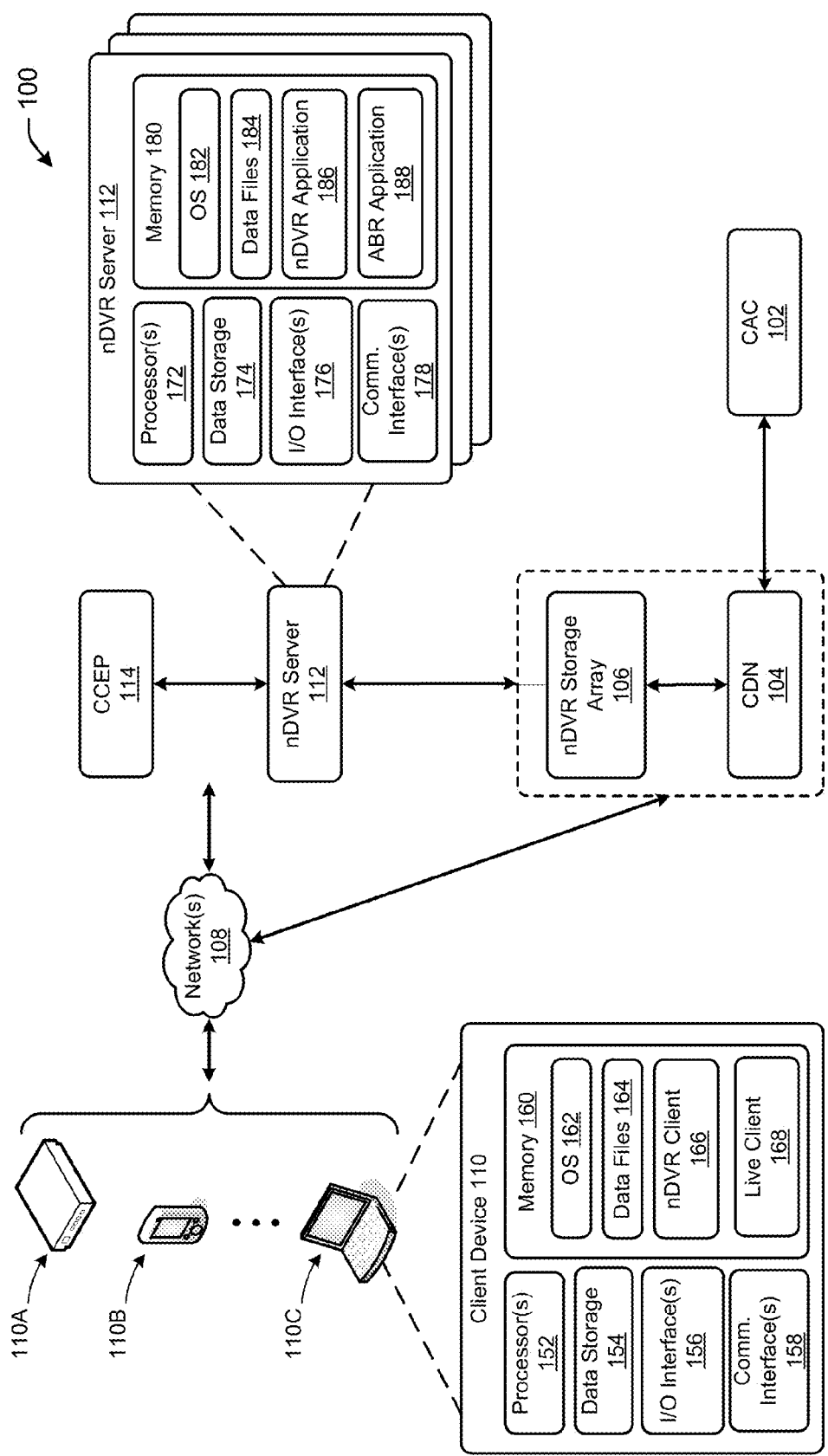
FIG. 1 is a block diagram of a system for cloud-enabled network-based digital video recording (nDVR), in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments of the disclosure are described more fully hereinafter with reference to the accompanying drawings in which embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure may include systems and methods for establishing a cloud-enabled network-based digital video recording (nDVR) platform. In some embodiments, an nDVR system may include multiple systems working together to provide DVR services. For example, in some embodiments, an nDVR system may be associated with an adaptive bit-rate (ABR) live-video distribution system. The ABR live-video distribution system may include, but is not limited to, a content acquisition chain, a content distribution network, a curated content experience platform, and one or more client devices. The nDVR system may also include cloud storage. The cloud storage may comprise one or more storage arrays and one or more nDVR servers. The nDVR system may process transport streams of live content, wherein the processing may include encoding, transcoding, and rate-shaping of transport streams.

The nDVR system may provide the ability to dynamically adjust a quota system associated with a user account. For example, if a user is close to going over his or her given quota, rather than cancelling scheduled recordings or requiring immediate deletion of content assets, a user may be able to upgrade his or her user account in order to increase the user's quota. Additionally, the nDVR system may enable users to designate sub-users associated with a main account and enable different levels of functionality, permission, and/or quota for each account. This system gives users more flexibility in permitting different members of a household to access different content or functionality of the system based on their different sub-accounts.

The nDVR system further enables users to schedule the recording of content. In some embodiments, scheduling content assets may include generating manifest files, scheduling entitlement validations, and scheduling quality control checks. The use of manifest files for adaptive bit-rate streaming of recorded content enables users to receive optimal content for their client devices, whether it is a smartphone or a large television, and taking their current network conditions into consideration.

The nDVR system may also utilize a deterministic naming scheme to increase the efficiency of the system. For example, the names of media segments may be based on multiple factors, which may include a content asset identifier, a source identifier, an indication of time, and the like. Because the names of the media segments are predictable, the nDVR system may create a manifest file independent of recording the requested content asset, thus decreasing processing that may be normally required at the time of recording the asset. In some embodiments, the nDVR system may also enable digital rights management technology.

The nDVR system may also utilize a file-level storage optimization that permits the system to reduce the number of write-cycles on the disk (e.g., extends life of the platter), which may enable the creation of an increased number of files given a specific write-cache (e.g., increases system throughput, especially write-side), and may provide storage optimizations in the system.

Additionally, the nDVR system may also provide the ability of legacy systems to receive cloud-enabled network-based DVR services. In some embodiments, a server-based virtual client may retrieve the appropriate bit-rate segments, decrypt, and stream out transport streams to a system such as some components of the legacy video-on-demand (VoD) platform. In some embodiments, the server-based virtual client may convert the stream to the format needed for the legacy devices (e.g., decryption, concatenation) and stream it to the legacy device.

FIG. 1 is a block diagram of a system 100 for facilitating a cloud-enabled network-based digital video recording (nDVR) system 100 and the delivery of content through the nDVR system 100, in accordance with an embodiment of the disclosure. In brief overview, a content acquisition chain (CAC) 102 may communicate with a content distribution network (CDN) 104. The nDVR storage array 106 may communicate with the CDN 104. One or more client devices 110 may communicate over one or more networks 108 with the nDVR server 112, nDVR storage array 106, and/or the CDN 104. The nDVR server 112 may communicate with a curated content experience platform (CCEP) 114.

The CAC 102 may communicate with the CDN 104. The CAC 102 may comprise one or more computing devices that provide content streaming, real-time and/or non-real-time content delivery, the delivery of stored and/or recorded content, or the like. Additionally, the CAC 102 may acquire and transcode content, segment the received content (e.g., adaptive bit-rate technology), and/or protect and encrypt the content. The CDN 104 may include one or more edge servers, one or more routers and/or bridges, one or more data center servers, one or more content databases, and/or one or more content servers. The various elements of the CDN 104 may cooperate to receive content from the CAC 102 and appropriately cache the content and/or transmit the content to a destination, such as the nDVR storage array 106 for access by one or more client devices 110.

The CDN 104 may be in communication with one or more nDVR storage arrays 106. The nDVR storage array 106 may store records associated with user accounts and any content assets that may be associated with the user accounts. The nDVR storage array 106 may be paired with an edge server of the CDN 104. In some embodiments, the nDVR storage array 106 may be managed as part of the CDN 104 or may be considered a separate component of the nDVR system 100.

The nDVR storage array 106 may be located between the edge of the CDN 104 and target markets (e.g., client devices 110). In some embodiments, one or more nDVR storage arrays 106 may be placed with the CDN 104, minimizing impact to the network transport. The one or more nDVR storage arrays 106 may retrieve content from the CDN 104.

In some embodiments, the nDVR storage array 106 may support a storage optimization below the file level. The nDVR storage array 106 may copy a file from a location on the CDN 104 to a list of target locations. Because the nDVR storage array 106 knows that all of the source files are identical, the nDVR storage array 106 may optimize the write-cache, saving not only disk space, but also improving the performance of the nDVR storage array 106. Further details for storage optimization below the file level are discussed below in relation to FIG. 6.

One or more client devices 110 may communicate over one or more networks 108 with the nDVR server 112, nDVR storage array 106, and/or the CDN 104. Suitable client devices 110 may include, but are not limited to, a set top-box (STB) 110A, smartphones 110B, laptop computers 110C, tablets, electronic book reading devices, processor-based devices, or the like.

The client device 110 may communicate with the nDVR server 112, the nDVR storage array 106, and/or the CDN 104 over one or more types of networks 108, such as a wireless fidelity (Wi-Fi) network, a Wi-Fi Direct network, Bluetooth®, a radio network, a cellular network (e.g., third generation or fourth generation), a satellite network, a cable network, a landline-based network, the Internet, intranets, a telephone network, a television network, data networks, or other communication mediums connecting multiple computing devices to one another, as non-limiting examples.

The client device 110 may comprise one or more processors 152, one or more memories 160, data storage 154, one or more input/output (I/O) interfaces 156, and one or more communication interfaces 158. The one or more processors 152 may individually comprise one or more cores and may be configured to access and execute, at least in part, instructions stored in the one or more memories 160. The one or more memories 160 comprise one or more computer-readable storage media (CRSM). The one or more memories 160 may include, but are not limited to, random access memory (RAM), flash RAM, magnetic media, optical media, and so forth. The one or more memories 160 may be volatile in that information is retained while providing power or non-volatile in that information is retained without providing power.

The client device 110 may further include additional data storage 154 such as removable storage and/or non-removable storage including, but not limited to, magnetic storage, optical disk storage, and/or tape storage. Data storage 154 may provide non-volatile storage of computer-executable instructions and other data. The memory 160 and/or the data storage 154, removable and/or non-removable, are examples of CRSM.

The one or more I/O interfaces 156 may also be provided in the client device 110. These I/O interfaces 156 allow for coupling devices, such as keyboards, joysticks, touch sensors, cameras, microphones, speakers, haptic output devices, memories, and so forth, to the client device 110.

The one or more communication interfaces 158 provide for the transfer of data between the client device 110 and another device directly, via a network, or both. The communication interfaces 158 may include, but are not limited to, personal area networks (PANs), wired local area networks (LANs), wireless local area networks (WLANs), wireless wide area networks (WWANs), and so forth. The communication interfaces 158 may utilize acoustic, radio frequency, optical, or other signals to exchange data between the client device 110 and another device such as an access point, a host computer, a router, an e-reader device, another client device 110, and the like.

The one or more memories 160 may store instructions for execution by the processor 152 to perform certain actions or functions. These instructions may include an operating system (OS) 162 configured to manage hardware resources, such as the I/O interfaces 156, and provide various services to applications executing on the processor 152. The one or more memories 160 may also store data files 164 containing information about the operating system 162.

An nDVR client 166 may be stored in the one or more memories 160. The nDVR client 166 may receive or access information associated with an nDVR system 100. In some embodiments, the nDVR client 166 may communicate over one or more networks 108 with an nDVR server 112 or an nDVR storage array 106.

The live client 168 may be stored in the one or more memories 160. The live client 168 may receive information collected or generated by the nDVR client 166. In some embodiments, the live client 168 may be in communication over one or more networks 108 with the CDN 104.

Within the one or more memories 160, one or more modules may be stored. As used herein, the term module designates a functional collection of instructions that may be executed by the one or more processors 152. For convenience in description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The nDVR server 112 may communicate with the nDVR storage array 106 to create user records and/or directories, create asset records and/or directories, create and store manifest files, place entries in the nDVR storage array 106 for each segment time period to be recorded and/or stored, change the state of the asset (e.g., change the state associated with the asset record to "recording" after receiving the first media segment, change the state associated with the asset record to "recorded" after receiving the last media segment for the content asset), calculate asset-specific quota data, associate entitlement checking data, and/or schedule and perform quality control for content assets. The nDVR server 112 may also comprise record events for functionality associated with the nDVR system 100, such as scheduling recordings, quality control checks, entitlement checks, validation checks, and the like.

The one or more nDVR servers 112 may comprise one or more processors 172, one or more memories 180, data storage 174, one or more input/output (I/O) interfaces 176, and one or more communication interfaces 178. The one or more processors 172 may individually comprise one or more cores and may be configured to access and execute, at least in part, instructions stored in the one or more memories 180. The one or more memories 180 comprise one or more CRSM. The one or more memories 180 may include, but are not limited to, RAM, flash RAM, magnetic media, optical media, and so forth. The one or more memories 180 may be volatile in that information is retained while providing power or non-volatile in that information is retained without providing power.

The nDVR server 112 may further include additional data storage 174 such as removable storage and/or non-removable storage including, but not limited to, magnetic storage, optical disk storage, and/or tape storage. Data storage 174 may provide non-volatile storage of computer-executable instructions and other data. The memory 180 and/or the data storage 174, removable and/or non-removable, are examples of CRSM.

The one or more I/O interfaces 176 may also be provided in the nDVR server 112. These I/O interfaces 176 allow for coupling devices, such as keyboards, joysticks, touch sensors, cameras, microphones, speakers, haptic output devices, memories, and so forth, to the nDVR server 112.

The one or more communication interfaces 178 provide for the transfer of data between the nDVR server 112 and another device directly, via a network, or both. The communication interfaces 178 may include, but are not limited to, PANs, LANs, WLANs, WWANs, and so forth. The communication interfaces 178 may utilize acoustic, radio frequency, optical, or other signals to exchange data between the nDVR server 112 and another device such as a client device 110, another nDVR server 112, an nDVR storage array 106, or the like.

The one or more memories 180 may store instructions for execution by the processor 172 to perform certain actions or functions. These instructions may include an operating system (OS) 182 configured to manage hardware resources, such as the I/O interfaces 176, and provide various services to applications executing on the processor 172. The one or more memories 180 may also store data files 184 containing information about the operating system 182.

An nDVR application 186 may be stored in the one or more memories 180. The nDVR application 186 may receive requests from one or more client devices 110, schedule recordings, perform validation checks, perform quality control checks, and other nDVR functionality. In some embodiments, the nDVR application 186 may communicate over one or more networks 108 with an nDVR storage array 106, one or more client devices 110, or other devices in the nDVR system 100.

The adaptive bit-rate (ABR) application 188 may be stored in the one or more memories 180. The ABR application 188 may receive information associated with the network connection quality and/or the client device 110 to determine an adaptive bit-rate associated with the client device 110. The ABR application 188 may determine an optimal set of bit-rates associated with a particular device class associated with the client device 110 based at least in part on the information associated with the client device 110, the information associated with the network connection quality of the client device 110, the received request from the client device 110, and/or a user account profile associated with the client device 110.

Within the one or more memories 180, one or more modules may be stored. As used herein, the term module designates a functional collection of instructions that may be executed by the one or more processors 172. For convenience in description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The nDVR server 112 may be in communication with a curated content experience platform (CCEP) 114. The CCEP 114 may provide guide data (e.g., linear video metadata management), application interface servers (e.g., API servers or "app servers" for linear and on-demand services), and/or a content and service protection platform (e.g., a combination of privacy, network security, conditional access, and content protection of digital rights components).

In some embodiments, the nDVR system 100 may be associated with an ABR live-video distribution system. The ABR live-video distribution system may comprise a CAC 102, a CDN 104, a CCEP 114, and one or more client devices 110. The nDVR cloud storage may comprise one or more nDVR storage arrays 106 and one or more nDVR servers 112. The nDVR cloud storage may process transport streams of live content, wherein the processing may include encoding, transcoding, and rate-shaping of transport streams.

In some embodiments, the nDVR server 112 may manage source data, which may describe where the source is located, and any information that may be requested by a user in association with the content asset (e.g., rating information for the content asset, duration of the asset, date the content asset was recorded, and the like). For example, in some embodiments, the nDVR server 112 may store the "current" segment duration for each source (e.g., CDN 104 server). In some embodiments, other characteristics may also be stored in association with the content asset. The nDVR server 112 may store information indicating whether the segment should be stored in a manner so that each user receives a copy of the segment or if a segment may be shared by multiple users (e.g., utilizing the write-level optimization discussed in relation to FIG. 6).

In some embodiments, the nDVR client 166 may generate and transmit a request to the nDVR application 186 for a list of content assets associated with the user account associated with the client device 110. The nDVR application 186 may retrieve or otherwise obtain information from one or more nDVR storage arrays 106 and generate a list of all assets associated with the user account and metadata associated with the content assets. For example, the metadata may include, but is not limited to, availability of the content asset, quota information associated with the content asset, or the like. In some embodiments, the list of all of the content assets associated with a user account, recording state, and quota information may be compiled and transmitted to the nDVR client 166 of a client device 110.

In some embodiments, a user account may be a multi-user account, wherein multiple users may be associated with each other. For example, a household may include multiple people, where each person has a user account. In some embodiments, one of the user accounts of the household may be designated as the main account holder. The main account holder may have the ability to designate account-level and user-level content. The main account holder may designate different levels of permission for different user accounts. In one example, the main account holder may designate user accounts associated with users under the age of 18 as children's accounts and those user accounts associated with users 18 and over as adult accounts. The main account holder may then designate the availability of the recorded content on an account level (e.g., adults may have access to all recorded content; children may have access to content rated PG-13). In some embodiments, content-specific and feature-specific controls may be enabled. For example, a parent may "unlock" an asset for a given account sub-user independent of the program's metadata.

In some embodiments, the nDVR system 100 may provide the ability to dynamically adjust a quota system associated with a user account. A user may have a subscription that includes a pre-determined storage quota for content. If the user is close to going over his or her given quota, rather than cancelling scheduled recordings or requiring immediate deletion of content assets, a user may be able to upgrade his or her user account in order to increase the user's quota. In some embodiments, if the user is close to going over his or her given quota, a notification may be generated and transmitted to the user. The notification may be a text message, email message, phone call, or other type of notification. In some embodiments, the notification may include multiple upgrade options to increase the user's quota.

In some embodiments, the nDVR system may enable users to designate sub-users associated with a main account and assign different quotas for each sub-user. In some embodiments, the main user may receive notifications when the associated user is close to a pre-determined threshold. For example, an notification may be generated when the quota reaches 75% of its capacity. In some embodiments, the threshold is determined by the administrator. In some embodiments, the threshold may be designated by the main user associated with the account.

In some embodiments, priority-setting rules for deletion of content and co-existence of multiple quota management systems may be enabled. In some embodiments, content assets may be deleted by the date the content asset was recorded, the size of the content asset, the rating associated with the content asset, the sub-user who requested the recording of the content asset, and other metadata associated with the content asset. In some embodiments, if users had different quotas for different content providers, content may be shared across both but only counted towards one of the given quotas.

In some embodiments, content assets may be modified at a certain level by a user, such as the removal of content (e.g., advertisements) or removal of recording pre-roll content (e.g., content recorded prior to a desired show). In some embodiments, the nDVR server 112 may enable users to "remove" content from the recording on a segment-by-segment basis. In some embodiments, the nDVR server 112 may permit the user to fine-tune and/or remove content within a segment. Customizations to recordings may be shared between users as asset-specific templates and may be applied by other users to their copies of that asset.

In some embodiments, the nDVR application 186 may permit the user to request a re-creation or re-generation of a manifest file. This may be initiated by the nDVR client 166 if problems are detected, or to undo changes made to the manifest file. In some embodiments, this feature may incorporate the quality control and content replacement processes as needed.

In some embodiments, some content (e.g., advertisements) may be replaced in recorded content with different content (e.g., targeted advertisements). In some embodiments, whole-segment boundaries may be replaced by replacing the entries for the segments in the manifest file with new entries (e.g., URIs) pointing to the new content segments. The injection of new content may be performed after the manifest file has been created. The replacement content may use a single copy of the transport stream files even when individual versions of the asset transport stream files are created. After the replacement content has been played by the user, the nDVR application 186 may automatically replace the replacement content with different replacement content or remove the identified content (e.g., advertisements) from the recorded content asset.

In some embodiments, the nDVR application 186 may enable users to edit or fine tune a content asset which may result in the creation of a template or "recipe file" (different than the manifest file) that may be applied to content assets recorded by a different user. The template or recipe file would not have URIs. Instead, the template or recipe file may comprise information independent of the video profile, such as information about the source and the segment time such that the deletion of that segment could be recreated by the client device 110 of a different user. In some embodiments, the nDVR application 186 may enable users to create "modified" segments that actually remove portions of the segment for finer-control of editing. The original segments may be stored in association with the modified segments. The modification to the content asset may be reflected in the manifest file or a template associated with the user account.

In some embodiments, the recipe file may instruct a client device 110 to create new segments based upon the information in the template or recipe file for a particular time segment or media segment. The nDVR server 112 may create and modify the templates responsive to information received from client devices 110 and store them in association with the appropriate client accounts in the nDVR storage array 106. In some embodiments, the template may be shared over one or more social networking tools. When a user shares a template or recipe file with a second user, the second user will have a copy of the recipe file stored in association with their account in the nDVR storage array 106.

In some embodiments, the nDVR application 186 may enable users to create "modified" segments that remove portions of the segment for finer control of editing. The original segments are stored in association with the modified segments.

In some embodiments, a process associated with the nDVR application 186 may manage asset metadata. Asset metadata may describe the asset and any information associated with the asset that may be needed by the client device 110. Asset metadata may include but is not limited to rating information for various time-periods covered by the asset. This may remove dependencies on external systems for the metadata and may be used as the primary or backup location of metadata associated with the content asset. The nDVR server 112 may generate an asset metadata file and store the file in the nDVR storage array 106 in association with the content asset. The nDVR server 112 may transmit the asset metadata file to a client device 110 responsive to a request from the client device 110 for metadata for a content asset. The client device 110 may present the metadata, which may include extended information associated with the content asset. In some embodiments, the metadata may augment guide data received in association with the content asset. In some embodiments, the metadata may be used in lieu of the guide data associated with the content asset.

In some embodiments, the nDVR system 100 may include an nDVR guide server (not pictured). A process executing on the nDVR guide server may generate and maintain records, which may be primarily organized around content asset series and/or users wishing to record events from the content asset series that may include criteria and historical information associated with the content asset series. The nDVR guide server may communicate with the nDVR server 112 to permit users to identify and edit their scheduled recordings of episodes viewed and episodes previously recorded. In some embodiments, the level of interest for specific episodes may also be identified and modified (e.g., priority of recording).

The nDVR guide server may scan the nDVR server 112 and/or other entity in the nDVR system 110 to monitor series recording information and monitor the guide data for any changes. If the nDVR guide server identifies any changes in the guide data, the nDVR guide server may communicate with the nDVR server 112. Responsive to the communication from the nDVR guide server, the nDVR server 112 may scan any scheduled recordings associated with the content asset series. If the nDVR server 112 identifies any scheduled recordings that may be affected by the change in guide date, the nDVR server 112 may initiate a particular course of action, which may include but is not limited to scheduling a second or "ghost" recording of the particular content asset in the series from a different source and/or a different time and/or date, which it may temporarily be "exempt" from quota. In some embodiments, the nDVR server 112 may generate a notification to the user regarding the change in the guide data and request further information to maximize the chance that the desired content is recorded.

Figure 2:
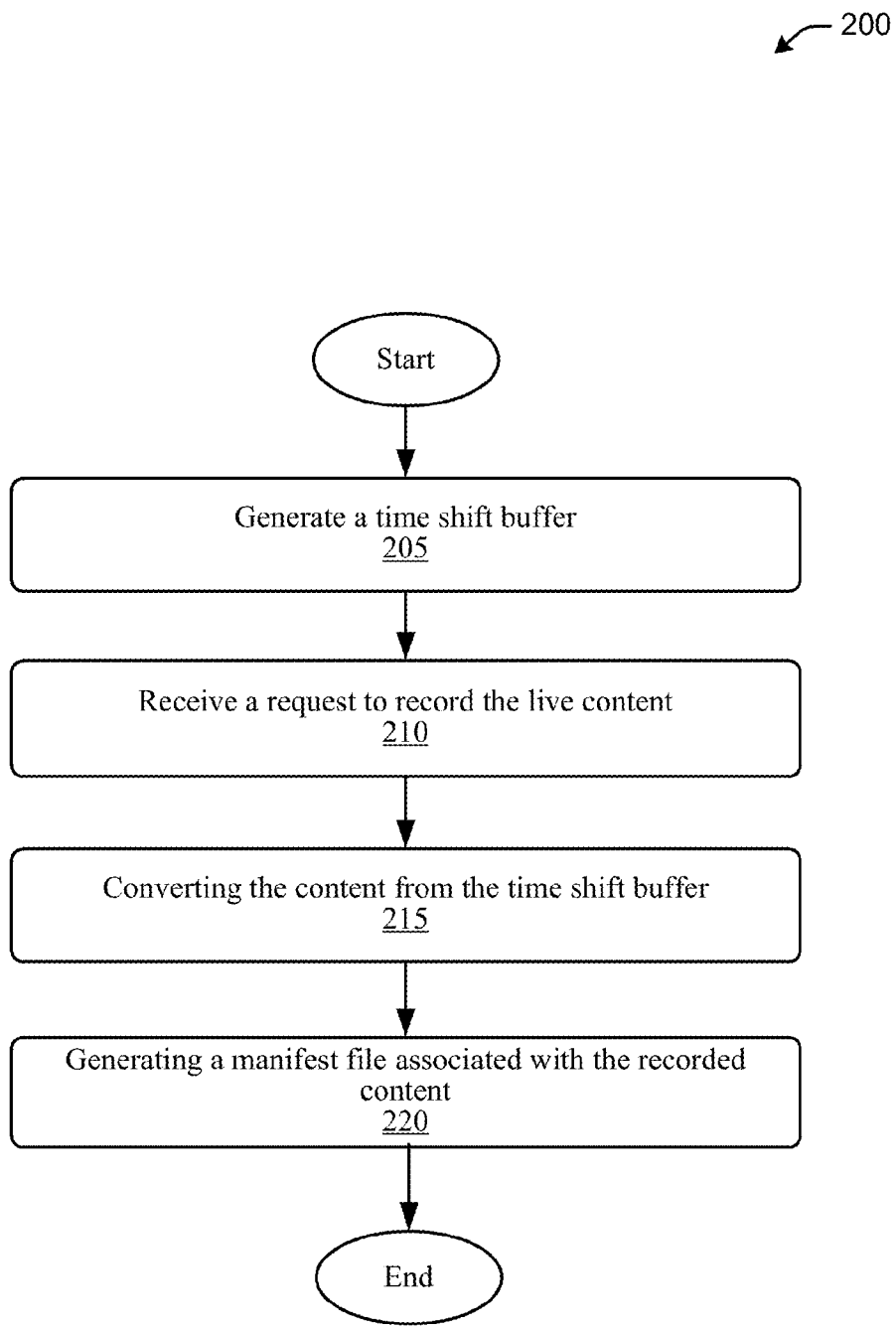
FIG. 2 is a flow diagram of a method for pausing and recording live content in an nDVR system, in accordance with an embodiment of the disclosure.

FIG. 2 is a flow diagram of a method for pausing and recording live content in an nDVR system, in accordance with an embodiment of the disclosure. In brief overview, at block 205 a time shift buffer may be generated. At block 210, a request may be received to record live content. At block 215, the content from the time shift buffer may be converted responsive to the request. At block 220, a manifest file associated with the recorded content may be generated.

At block 205, a time shift buffer may be generated. In some embodiments, time shift buffers may be generated to enable customers to pause live content. In some embodiments, the time shift buffers may be local directories to temporarily store content segments received from the CDN 104 during a live broadcast of a content asset. A user may pause, rewind, or fast-forward the live content stored in the time shift buffer via the live client 168 of the client device 110. Time shift buffers may be individual user-based rolling recordings for pre-determined durations. For example, if a time shift buffer is set for three hours, when the maximum duration has been reached, content at the beginning of the buffer may be deleted in order to save new content. In some embodiments, the duration of a time shift buffer may be set as a subscription option (e.g., 30 minutes, 60 minutes, etc.), may be designated by an administrator of the nDVR system 100, or may be designated by the user. In some embodiments, the contents of the time shift buffer may not be counted toward the quota associated with the user account.

In some embodiments, the content segments received by the time shift buffer from the CDN 104 during the live broadcast may only be kept for a specific duration. In some embodiments, the content segments received by the time shift buffer from the CDN 104 during the live broadcast may only be kept until the user changes the data source (e.g., television channel) or turns off the client device 110. In some embodiments, multiple time shift buffers may be available to enable swap functionality (e.g., permitting the user to swap between two or more channels) or picture-in-picture functionality.

At block 210, a request may be received to record live content. In some embodiments, the user may use the live client 168 to indicate he or she wishes to record the live content. The request may be generated by the live client 168 and transmitted to the nDVR client 166.

At block 215, the content from the time shift buffer may be converted responsive to the request. In some embodiments, the nDVR client 166 may receive a request to record the live content, and all of the content of the time shift buffer may be converted to a recording. In some embodiments, the conversion of the live content to a recording may comprise transmitting the contents of the time shift buffer to a directory in the nDVR storage array 106 associated with the user account for the client device 110. In some embodiments, the nDVR client 166 may obtain portions of the requested content that may be missing. For example, if a user began watching a show 10 minutes after the show began, when the user requests to record the live content, the time shift buffer may only contain media segments from the moment the user turned on the client device and tuned to the live content. In some embodiments, the requested recording may only include portions of the live content viewed by the user. In some embodiments, the entire live content may be obtained from the CDN 104 or the nDVR storage array 106 and stored to the user directory associated with the client device 110.

At block 220, a manifest file associated with the recorded content may be generated. In some embodiments, the manifest file may be generated by the nDVR client 166, the nDVR server 112, the nDVR storage array 106, or another entity in the nDVR system 100. In some embodiments, a manifest file is generated for the recording because manifest files and quality control checks are not generated for live content. In some embodiments, the nDVR client 166 may generate a manifest file for live content and may discard the manifest file once the contents of the time shift buffer are deleted. The generated manifest file may be transmitted to the nDVR system (e.g., nDVR server 112, nDVR storage array 106, or another entity in the nDVR system 100) for storage in association with the recorded content.

Additionally, the nDVR server 112 may perform segmentation of the transport stream received from the live client 168 of the client device 110. The segmentation of the transport stream may comprise dividing the transport stream into a plurality of media segments and storing the media segments in the nDVR storage array 106.

In some embodiments, a process associated with the nDVR application 186 may manage a plurality of sources in the nDVR system 100. In managing a source, the process may determine the location within the CDN 104. In some embodiments, the location of the source may be manually entered by an administrator of the system. In some embodiments, the location of the source may be determined by obtaining the information from one or more records in the system. In some embodiments, the location of the CDN 104 may be received from the source itself. In some embodiments, the process may make an association between a source and a particular location in the CDN 104. In some embodiments, the location may be used to instruct the nDVR storage array 106 to retrieve a particular file. The process associated with the nDVR application 186 may also associate the source with a location to retrieve or otherwise obtain guide data or metadata for the content assets from the source.

The process may also determine which rights are associated with the source. For example, the source may permit one copy of a content asset per user or may permit one copy of the content asset to be used by multiple users. This may affect the instructions issued by the nDVR server 112 to the nDVR storage array 106 to copy a file associated with the content asset to one location or to clone the file to multiple locations.

Additionally, the process may monitor the duration of live segments. The live segment durations may be used by a process in the generation of a manifest file. The process may monitor the live segment durations and maintain and/or update records associated with the content asset from the source on the CDN 104.

Figure 3:
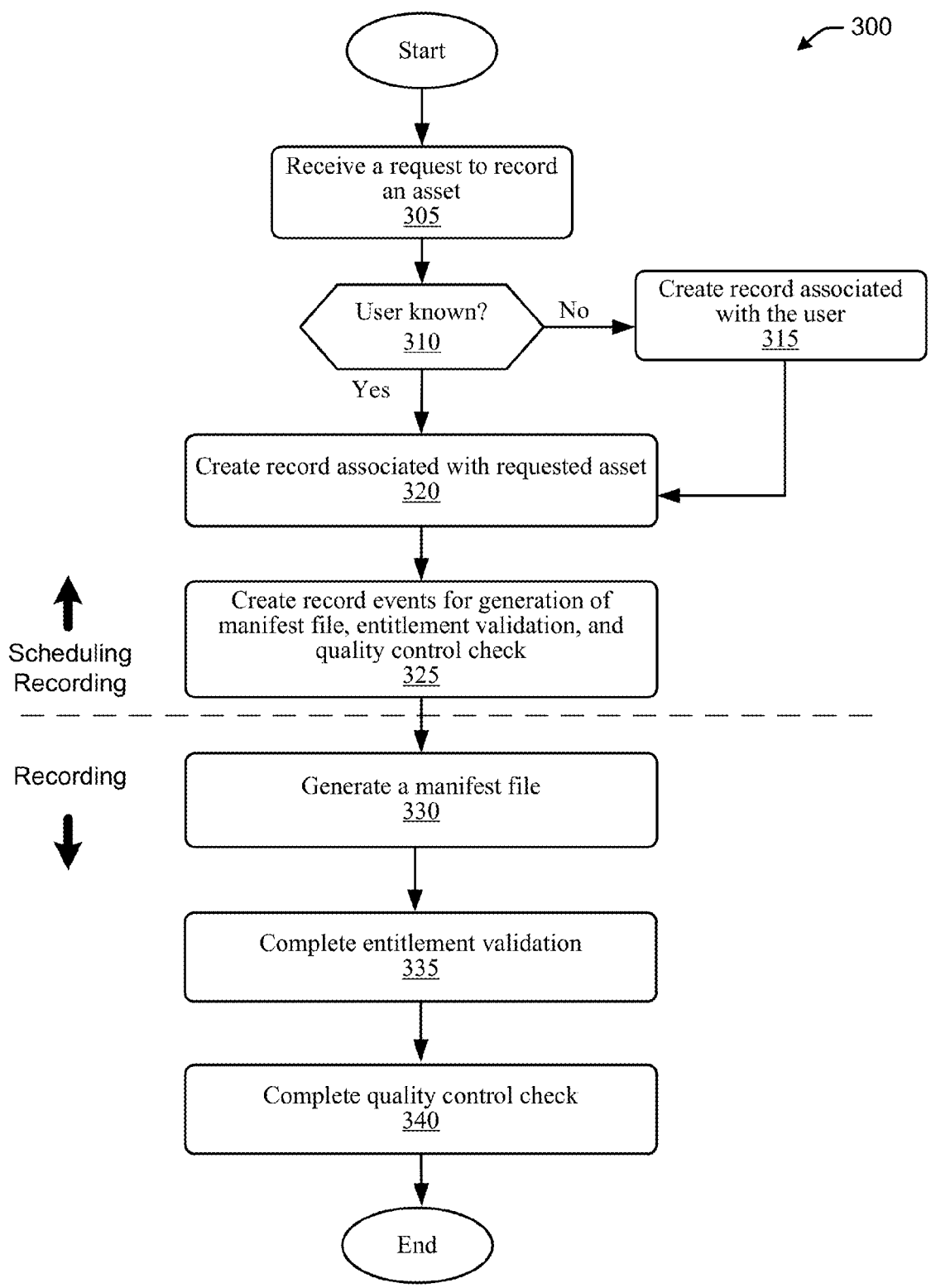
FIG. 3 is a flow diagram of a method for scheduling a recording in an nDVR system, in accordance with an embodiment of the disclosure.

FIG. 3 is a flow diagram of a method 300 for scheduling a recording in an nDVR system 100, in accordance with an embodiment of the disclosure. In brief overview, at block 305, a request may be received to record an asset. At block 310, a determination may be made whether a user is known in the system 100. If the user is not known, then at block 315, a record associated with the user may be created. If the user is known, at block 320 a record associated with the requested asset may be created. At block 325, record events may be created for events, such as, but not limited to, the generation of a manifest file associated with the asset, the completion of an entitlement validation associated with the asset for the user, and the completion of a quality control check associated with the asset. At block 330, a manifest file may be generated.

At block 335, an entitlement validation associated with the asset for the user may be completed. At block 340, a quality control check associated with the asset may be completed. In some embodiments, blocks 305-325 may be associated with scheduling a recording of a content asset. In some embodiments, blocks 330-340 may be associated with recording a content asset.

At block 305, a request may be received to record a content asset. The request may be received from a client device 110 associated with a user account. The request may include one or more of a user identifier, a source and/or channel identifier, a start time associated with a content asset, and the duration associated with the content asset. In some embodiments, the source identifier may be in the form of a uniform resource identifier (URI).

At block 310, a determination is made whether a user is known in the system 100. In some embodiments, the nDVR server 112 may check the nDVR storage array 106 to determine if the user is known in the system 100. In some embodiments, the nDVR server 112 may check to see if a record or a directory associated with the user exists. The nDVR server 112 may use the user identifier received in the request to determine if a user is known in the system 100. In some embodiments, the nDVR server 112 may determine if the user identifier is associated with multiple users. In some embodiments, multiple people at a customer residence may use the nDVR system 100. A single person may be designated as the main user, but other users may be associated with the main user. For example, if a household comprises a family with two adults and three children, one adult may be designated as the main user and have a home directory associated with the main user. Associated users, such as the other adult and the children, may have affiliated user accounts. In a multi-user account, there may be account-level and user-level content, as well as content-specific and feature-specific parental controls, described below.

If the user is not known, then at block 315, a record associated with the user may be created in the nDVR system 100 (e.g., nDVR storage array 106). In some embodiments, a directory associated with the user may be created. In some embodiments, the nDVR server 112 may create a directory for affiliated users within or in association with the directory of the main user account. In some embodiments, an asset directory for the requested asset may exist. For example, if a user is requesting to schedule an episode of a television show, an asset directory may exist for the series. The nDVR server 112 may create a record or directory for the specific content asset (e.g., television episode). In some embodiments, scheduled recordings may overlap due to user-defined or administrator-defined configurations associated with pre-roll and post-roll settings associated with content assets.

If the user is known, at block 320 a record associated with the requested asset (e.g., asset record) may be created. The record associated with the requested asset may comprise information on the source of the content (e.g., in the form of a URI), a recording state, and an allocated portion of the quota for the user account. The allocated portion of the quota may be a descriptor and a value. In some embodiments, the asset record may comprise a state field, which may be set to "scheduled."

At block 325, the nDVR server 112 may create record events for events, such as, but not limited to, the generation of a manifest file associated with the asset, the completion of an entitlement validation associated with the asset for the user, and the completion of a quality control check associated with the asset. In some embodiments, record events may be stored in the nDVR storage array 106 the nDVR server 112, an nDVR database associated with the nDVR server 112, and/or other entity within the nDVR system 100 in association with the asset record.

Although blocks 330, 335, and 340 appear in FIG. 3 in sequential order, it should be noted that blocks 330, 335, and 340 may occur in different orders and their execution is not dependent upon each other.

At block 330, a manifest file may be generated. The manifest file may, in one aspect, provide information related to identifying the segments of media content that the client device 110 needs to acquire and sequencing those segments. Therefore, the manifest file may provide a sequential listing of files that the client device 110 needs to receive from the CDN 104 to correctly render media content to the one or more users. The manifest file, sometimes referred to as a playlist, may include information pertaining to segments of media that are to be streamed to the client device 110 to provide the media programming that is requested by the user. In other words, the manifest file, when provided to the client device 110, allows the client device 110, and more particularly, the one or more processors, to access segments of media from the CDN 104 in a particular sequence as indicated in the manifest file to provide complete media content to the user of the client device 110. For example, a 10-minute media content or programming may be partitioned into 300 media segments. In one aspect, the manifest file provided to the client device 110 may include information associated with accessing each of the 300 media segments in the correct order to provide complete media content to the user.

In some embodiments, a process associated with the nDVR server 112 may scan the nDVR storage array 106 at pre-determined intervals or responsive to triggering events to identify one or more record events indicating a manifest file needs to be generated for an asset. The manifest file associated with the asset may be generated prior to the airing or broadcast of the asset. The manifest file associated with the asset may be generated in near proximity to the beginning of the recording of the asset. The manifest file may be stored in the user directory in the nDVR storage array 106 of the requesting user. The manifest file may use the current segment duration for calculating the names of all of the expected media segments and use time boundaries to determine key references. After the manifest file is created, the record event for generation of the manifest file may be removed from the nDVR storage array 106. Further details for generation of a manifest file are discussed below in relation to FIG. 4.

At block 335, an entitlement validation associated with the asset for the user may be completed. An entitlement validation may ensure that a user is entitled to the content asset at the time it is aired or broadcast. Entitlement to the content asset may not be required to schedule a recording. If a user was entitled to the content asset and it was recorded, the user may play back the content even if the user is no longer entitled to the content asset. A process associated with the nDVR server 112 may check for entitlements for all scheduled recordings during the recording period. If the user is not entitled to the recording, any recorded content may be removed from the user directory, and all schedules for recording future portions of the content may be removed. Once a content asset has been validated by the process, the asset record may be updated (e.g., the state of the asset record may be changed to "recorded") to reflect that playback is available for that asset. Content may not be available for playback until the entitlement validation has been completed. Once an entitlement validation for an asset has been completed, the record event associated with the entitlement validation may be removed from the nDVR storage array 106. Further details for entitlement validation of an asset are discussed below in relation to FIG. 5.

At block 340, a quality control check associated with the asset may be completed. When recordings occur but have not been validated, they may be flagged, indicating that quality control needs to take place. The quality control process may traverse the manifest file and check for all of the files, updating the manifest file where corrections are needed. For example, modifications to the manifest file may be required if segment boundary times have changed. Additionally, missing segments may be concealed with alternate bandwidth versions or concealer segments (e.g., segments displaying a message, such as "Locating your video . . . "). Once a quality control check for an asset has been completed, the record event associated with the quality control check may be removed from the nDVR storage array 106. Further details for a quality control check of an asset are discussed below in relation to FIG. 7.

Responsive to scheduling the recording for a content asset, a response may be transmitted to the client device 110. The response may include an asset identifier. The response may also include quota data associated with the user.

In some embodiments, updates to guide data may be evaluated for series recordings and search-based recordings that exist in the nDVR storage array 106, and may result in scheduled recordings per user-configured settings. Changes in guide data may be evaluated. Users may be notified of changes and any resulting actions. If the content is found in another slot, it may be automatically scheduled in addition to the original slot, and the new slot may be exempted from the quota for a pre-determined period.

In some embodiments, a user, or an agent on behalf of a user, may schedule a series recording for content (e.g., television series). The client device 110 may transmit a request to the nDVR server 112 to schedule a series recording. The request may include a user identifier, a series identifier, a specified pre-roll (e.g., the time period prior to the scheduled airing of the asset), post-roll (e.g., the time period after the scheduled airing of the asset), and/or flags for various attributes of the content assets to be recorded. Flags for various attributes of the content assets may include flags for the format of the asset (e.g., high definition (HD) or standard definition (SD)), a specific source of the content asset (e.g., specifying a particular broadcast or cable channel), type of airing (e.g., first run of the content asset or reruns of the asset), or number of assets to record or maintain in the user directory.

In some embodiments, the nDVR server 112 may comprise an adaptive bit-rate (ABR) application 188 which may process a given media segment. The adaptive bit-rate module may learn about all of the bit-rate and profile versions available for a given segment and may keep track of the current set of files at all times. In some embodiments, the ABR application 188 may monitor expected segment duration and alert quality control if a segment duration has changed. The ABR application 188 may obtain a list of assets that meet a given list of criteria. For example, the ABR application 188 may identify all records that have an associated state of either "scheduled" or "recording" and the start-time is within the segment duration of the current time or has already passed.

In some embodiments, if the current time is later than the start time plus the duration of the content asset, the ABR application 188 may change the state to "recorded." For each profile of the specific source, the ABR application 188 may initiate a file clone process to create a copy of the file in each of the target locations.

In some embodiments, if a problem occurred with a recording, a notification may be generated for the user, and an attempt to reschedule the recording of the content asset may be made. Rescheduled assets may not count towards the quota associated with a user account. In some embodiments, the asset record may reflect information on the original asset). Rescheduled assets may not need to be the same channel or format (e.g., HD or SD), but preference may be given to the closest match.

In some embodiments, if the content asset that is being recorded is determined to be a live event, the recording may need to be extended in order to record the entire content asset. For example, if a football game is being recorded, and the game goes into overtime, the nDVR application 186 may need to extend the duration of the recording in order to capture the entire football game. In some embodiments, if a recording of a content asset is scheduled to follow a live event, such as a football game, and another airing or broadcast of the content asset is known, the nDVR application 186 may generate a notification to the user. The notification may comprise the information associated with the airing or broadcast of the content asset at a different time, day, and/or source and recommend to the user to select the alternate airing. In some embodiments, the nDVR application 186 may schedule a recording for the alternate airing of the content asset and record the content asset. The nDVR application 186 may generate a notification to the user requesting instructions regarding whether to keep or remove the recording of the content asset obtained from the alternate airing or broadcast. The recording of the content asset obtained from the alternate airing or broadcast may not be counted against the quota associated with the user account. In some embodiments, the extension of time resulting from live event overages may be exempted from the quota, although the original recording of the content asset may still count towards the quota. In some embodiments, social media outlets may be monitored by the nDVR server 112 to determine if a live event has run over the allocated time.

Figure 4:
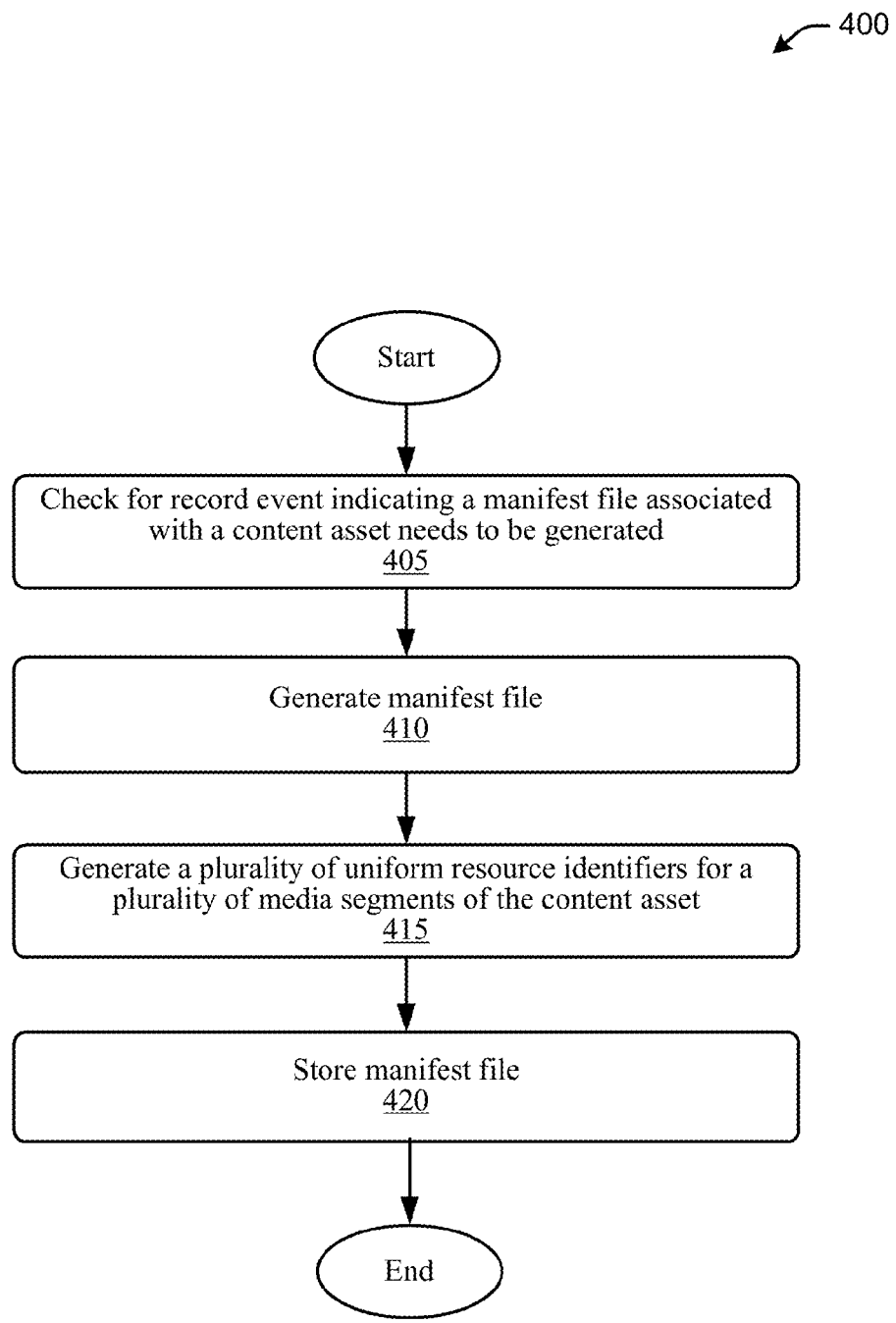
FIG. 4 is a flow diagram of a method for generating a manifest file for playback in an nDVR system, in accordance with an embodiment of the disclosure.

FIG. 4 is a flow diagram of a method 400 for generating a manifest file for playback in an nDVR system 100, in accordance with an embodiment of the disclosure. At block 405, a process associated with the nDVR application 186 may check for record events indicating a manifest file associated with a content asset needs to be generated. At block 410, the process may generate a plurality of uniform resource identifiers (URI) for a plurality of media segments of the content asset and store them in the manifest file. At block 415, the process may generate the manifest file. At block 420, the process may store the manifest file in the asset directory of the nDVR storage array 106 associated with the requesting user.

At block 405, a process associated with the nDVR application 186 may check for record events indicating a manifest file associated with a content asset needs to be generated. In some embodiments, the process associated with the nDVR application 186 may check for one or more record events at predetermined time intervals. For example, the process may scan the nDVR server 112 or a database associated with the nDVR server 112 containing the records associated with scheduled recordings. The process may scan to identify one or more record events indicating a manifest file needs to be created and may initiate generation of the manifest file or files. The process may scan or check for record events at predetermined time intervals, which in some embodiments, may be set by an administrator of the system 100. The scanning or checking for record events at predetermined time intervals may be independent of the recording of the content asset. In some embodiments, the process associated with the nDVR application 186 may check for record events responsive to a triggering event (e.g., receiving an indication that a content asset is being broadcast or aired).

In some embodiments, the record event indicating a manifest file associated with a content asset needs to be generated may have been created by the nDVR server 112 when the content asset was scheduled to be recorded. In some embodiments, the nDVR server 112 may generate a record event responsive to a user request to schedule a recording. In some embodiments, the nDVR server 112 may generate a record event response to a series recording event. In some embodiments, the record event associated with generating a manifest file for a content asset may be stored in the nDVR storage array 106. In some embodiments, the record event associated with the generation of a manifest file for the content asset may be stored in an nDVR database.

At block 410, the process may generate a plurality of uniform resource identifiers (URI) for a plurality of media segments of the content asset and store them in the manifest file. The naming of all of the media segments may be deterministic such that manifest files may be created and manipulated prior to the existence of the actual content. The file name for the media segments may contain information on the content source (e.g., source ID, source version), time (e.g., first full second in segmented media represented in UTC time or the like), and bit-rate (e.g., in kbps) and may include additional profile indicators as needed. In some embodiments, the duration of segments may be retrieved from one or more records maintained and/or updated by a process associated with the nDVR application 186 during source management, as described above.

For example, a media segment named "CB2A-01-01349007300-1800A.ts" may be generated using the following information:

CB2A=Source ID (52010)

01=primary version of this source (ad zones or blackout zones)

1349007300=09/30/2012 12:15:00 PM GMT (first full second in segment)

1800-1.8 Mbps (1800 kbps)

A=primary profile at this bit-rate (in case there are multiple profiles at the same bit-rate)

The nDVR application 186 may generate a plurality of URIs using the deterministic naming schema for the requested content asset and store the plurality of URIs in the manifest file for the requested content asset. Each segment name may include information associated with the source of the asset and other relevant information. Additionally, in order to support digital rights management systems, the deterministic naming schema of the media segments may be specified based on the source of the asset and time boundaries, which will direct the client device 110 to a DRM license generator that is capable of determining the appropriate key for the content.

At block 415, the process may generate the manifest file. In some embodiments, a manifest file may comprise one or more URIs of media segments or transport streams associated with the content asset. In some embodiments, the manifest file may be generated based upon at least in part the plurality of generated URIs. In some embodiments, multiple manifest files may be generated. For example, a manifest file may be generated for each bit-rate associated with a particular device-class (e.g., smartphone, tablet, television, etc.). In some embodiments, the manifest file may comprise all of the URIs for each of the different profiles (e.g., profiles associated with different device classes).

Additionally, manifest files may include information for encryption (e.g., based on predictable information such as source of the content asset and time associated with each media segment), URIs associated the plurality of media segments for each profile (e.g., profiles associated with different device classes), and URIs and/or information associated with information associated with a trick-mode file or thumbnail files and/or images. A trick-mode is a feature of digital video systems, which mimic the visual feedback given during fast-forward and rewind operations that were provided, by analogue systems such as VCRs by manipulating the video stream to include only a subset of frames. The thumbnail files and/or images associated with the media segment may be generated when an instantaneous decoding refresh (IDR) frame at the beginning of each media segment is converted to a thumbnail representing that media segment. In the case of 15-second media segments, the user may "walk" forward or backward in increments of 15 seconds for the content asset. The thumbnails associated with each media segment may be stored in association with the manifest file and links or URIs associated with the thumbnails may be stored in the manifest file.

At block 420, the process may store the manifest file in the asset directory of the nDVR storage array 106 associated with the requesting user. The manifest file may be stored in association with a user account associated with the request to record the content asset. For example, the manifest file may be stored in a directory in cloud storage associated with the user account. In the case of a sub-user, the manifest file may be stored in a sub-directory of a directory associated with the user account.

In some embodiments, the nDVR application 186 may convert an instantaneous decoding refresh (IDR) frame at the beginning of each media segment to a thumbnail representing that media segment. In the case of 15-second media segments, the user may "walk" forward or backward in increments of 15 seconds for the content asset. The thumbnails associated with each media segment may be stored by the nDVR application 186 in association with the manifest file.

The generation of the manifest file may happen in near proximity to the beginning of the recording of the asset. The generation of the manifest file may happen any time after the asset has been scheduled to be recorded and prior to the broadcast or airing of the asset. After the manifest file has been created and stored in the asset directory associated with the user, the record event may be removed from the nDVR storage array 106.

Figure 5:
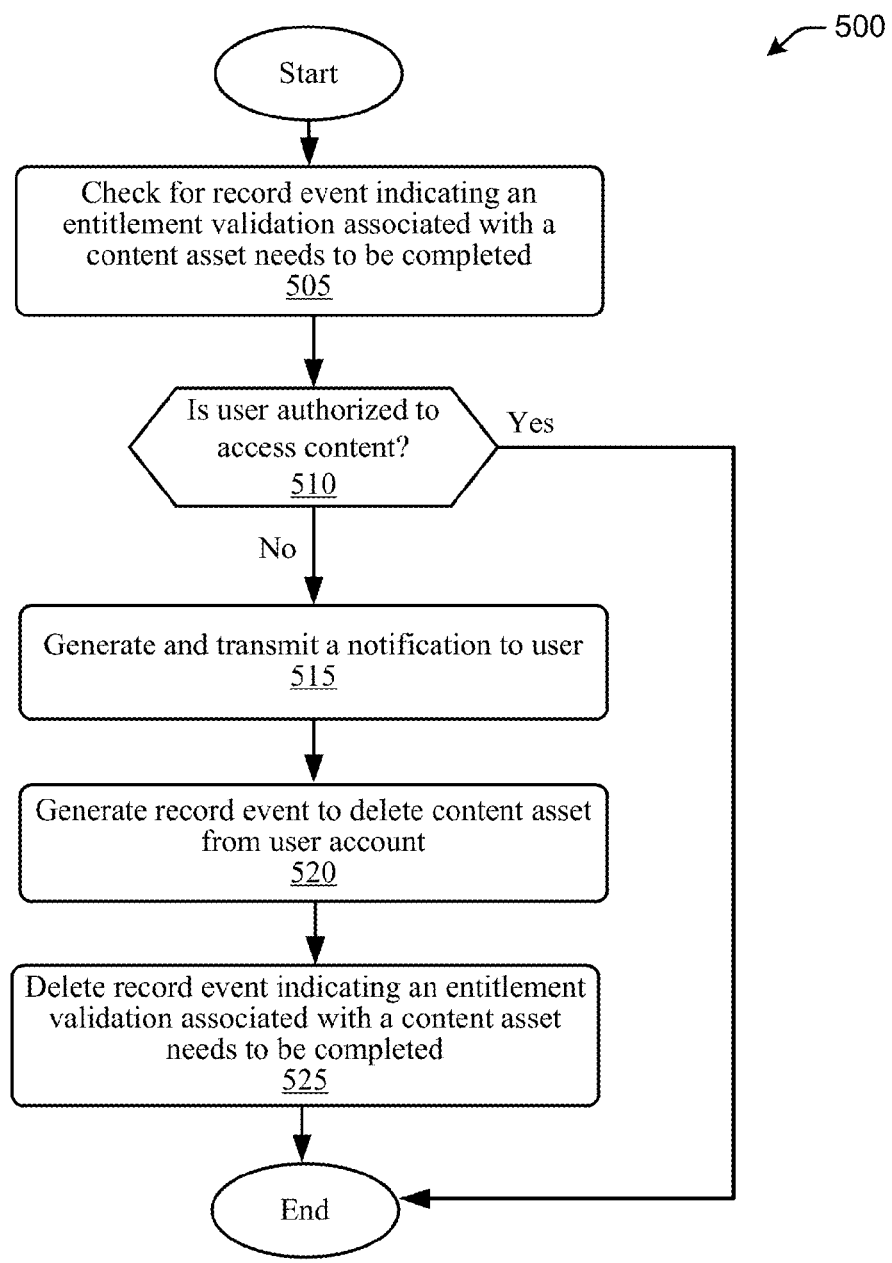
FIG. 5 is a flow diagram of a method for entitlement validation of a content asset in an nDVR system, in accordance with an embodiment of the disclosure.

FIG. 5 is a flow diagram of a method 500 for entitlement validation of a content asset in an nDVR system 100, in accordance with an embodiment of the disclosure. At block 505, a process associated with the nDVR application 186 may check for record events indicating an entitlement validation associated with an asset for a user needs to be completed. At block 510, the process determines whether the user is authorized or entitled to access the content in proximity to the airtime or time of broadcast of the content asset. If the process determines the user is authorized to access the content, then no further action may be taken. In some embodiments, the process may remove the record event associated with the entitlement validation from the nDVR storage array 106 responsive to the determination that the user is entitled to access the asset. If the process determines the user is not authorized to access the asset, then at block 515, the process may generate and transmit a notification to the user. At block 520, the process may generate a record event indicating that the content asset should be removed from the user account. At block 525, the process may delete the record event indicating an entitlement validation associated with a content asset needs to be completed.

At block 505, a process associated with the nDVR application 186 may check for record events indicating an entitlement validation associated with an asset for a user needs to be completed. In some embodiments, the process associated with the nDVR application 186 may check for one or more record events at predetermined time intervals. For example, the process may scan the nDVR server 112 or a database associated with the nDVR server 112 containing the records associated with scheduled recordings. The process may scan to identify one or more record events indicating an entitlement validation needs to be completed. The process may scan or check for record events at predetermined time intervals, which in some embodiments, may be set by an administrator of the system 100. In some embodiments, the process associated with the nDVR application 186 may check for record events responsive to a triggering event (e.g., receiving an indication that a content asset is being broadcast or aired).

In some embodiments, the process may scan or check to identify for record events indicating an entitlement validation needs to be completed periodically. The process may check the time of the scheduled recording and the current time and if the time of the scheduled recording and the current time fall within a predetermined threshold, the process may initiate the entitlement validation associated with the content asset.

In some embodiments, the nDVR server 112 may have created a record event associated with an entitlement validation at the time the content asset was scheduled to be recorded. In some embodiments, the nDVR server 112 may generate a record event responsive to a user request to schedule a recording. In some embodiments, the nDVR server 112 may generate a record event response to a series recording event. In some embodiments, the record event associated with an entitlement validation for a content asset may be stored in the nDVR server 112, nDVR storage array 106, and/or another entity in the nDVR system 100. In some embodiments, the record event associated with the entitlement validation for the content asset may be stored in an nDVR database associated with the nDVR server 112.

At block 510, the process determines whether the user is authorized or entitled to access the content in proximity to the air time or time of broadcast of the content asset. If the process determines the user is authorized to access the content, then no further action may be taken. In some embodiments, the process may remove the record event associated with the entitlement validation from the nDVR storage array 106 responsive to the determination that the user is entitled to access the asset. If the process determines the user is not authorized to access the asset, then at block 515, the process may generate and transmit a notification to the user.

At block 520, the process may generate a record event indicating that the content asset should be removed from the user account. The record event indicating that the content asset should be removed may be stored in the nDVR storage array 106 or in an nDVR database.

At block 525, the process may delete the record event indicating an entitlement validation associated with a content asset needs to be completed.

In some embodiments, users must be entitled to the content at the time the content is aired. Entitlement may not be required to schedule a recording of a content asset. If a user was entitled to the content and it was recorded, the user can play back the content even if the user is no longer entitled to the content.

The nDVR application 186 may check for entitlements for all scheduled recordings during the recording period of the content asset. If the user is not entitled to the recording, any recorded content may be deleted from the user directory, and all schedules for recording future portions of the content may be removed.

Once the content entitlement has been validated, the asset record may be updated to reflect that playback is available for that asset. Content may not be available for playback until the entitlement check has occurred. If playback is attempted, and the nDVR application 186 determines that there is not sufficient recorded content, the user may be directed to the live content that may be currently airing or broadcast. If playback is attempted and sufficient time has passed, the entitlement check may be accelerated, and the entitlement validation record may be removed.

The nDVR application 186 may check or scan the nDVR storage array 106 or nDVR database to identify record events associated with entitlement checks that may have been scheduled. If the user is determined to be entitled to the content asset, the record event for the entitlement check is deleted. If the user is not entitled to the asset, the asset record state may be changed to "not authorized." The quota information associated with the user account may be modified. A user notification may be generated. A record event may be created to delete the scheduled recording. In some embodiments, the record indicating the asset should be deleted is created with a pre-determined time interval in the future (e.g., five minutes in the future).

In some embodiments, the nDVR application 186 may provide the user an option to upgrade his or her account level or otherwise acquire access to the content prior to the time of recording. The nDVR application 186 may periodically contact the user through messages in the system, emails, text messages, or other forms of communication to indicate that the user currently does not have sufficient rights to access the asset and may provide one or more options to obtain the rights to access the content.

When a cancelled recording request is received or a request to delete recorded content is received, the nDVR application 186 may remove any entries in future copies or clone jobs. The nDVR application 186 may remove all files and associated directories for the content asset. The nDVR application 186 may remove the record for the content asset.

In some embodiments, the asset state may be changed to "deleted" and a record may be created to delete the asset (with a delete time-date assigned based on circumstances, generally past a configured "undelete" period). The nDVR application 186 may check the nDVR storage array 106 to identify entries with a time stamp that has passed. A call may be made to the nDVR storage array 106 to iteratively delete all files and directories under the main asset directory and then to remove the asset directory. The asset record may then be removed from the nDVR storage array 106. The deleted record may then be removed from the nDVR storage array 106. In some embodiments, if a request is received to "undelete" an asset during a configured "undelete" period, the record event associated with the content asset signaling the nDVR application 186 to remove the asset record from the nDVR storage array 106 may be deleted, thus ensuring the content asset will remain in the directory associated with the user account. If the "undelete" request is received past the configured "undelete" period, then the content asset may not be undeleted. In some embodiments, the nDVR application 186 may generate a notification to the client device 110 comprising the next date, time, and source the content asset may be aired and request whether the user would like to schedule a recording for the content asset.

In some embodiments, if a content asset is scheduled to be deleted because a user exceeded their quota, the nDVR application 186 may indicate the record associated with the content asset as such (e.g., the record state may be set as "-delete-quota"). The nDVR application 186 may periodically scan records associated with content assets to identify those records marked for deletion because a user exceeded their quota. In some embodiments, the nDVR application 186 may generate a notification to the user. The notification may be a text message, email message, phone call, or other type of notification. In some embodiments, the notification may include multiple upgrade options to increase the user's quota. If the user selects an upgrade option from a client device 110, the nDVR application 186 may receive an indication of a selection from the user.

Responsive to the indication received from the user, the nDVR application may "undelete" the content asset marked for deletion because the user exceeded their quota by removing the delete record event or modifying the state of the record to remove the delete state. In some embodiments, responsive to receive an indication of a selection from the user, the nDVR application 186 may generate a message to the user, asking whether the content assets marked for deletion should be kept. If the user indicates that they would like to keep the content asset, then the nDVR application 186 may remove the delete record event or modify the state of the record to remove the delete state. If the user indicates that they would like to delete the content asset, the nDVR application 186 may do nothing and permit the content asset to be deleted after a pre-determined time. In some embodiments, the nDVR application 186 may initiate a process to delete the content asset from the user's account.

Figure 6:
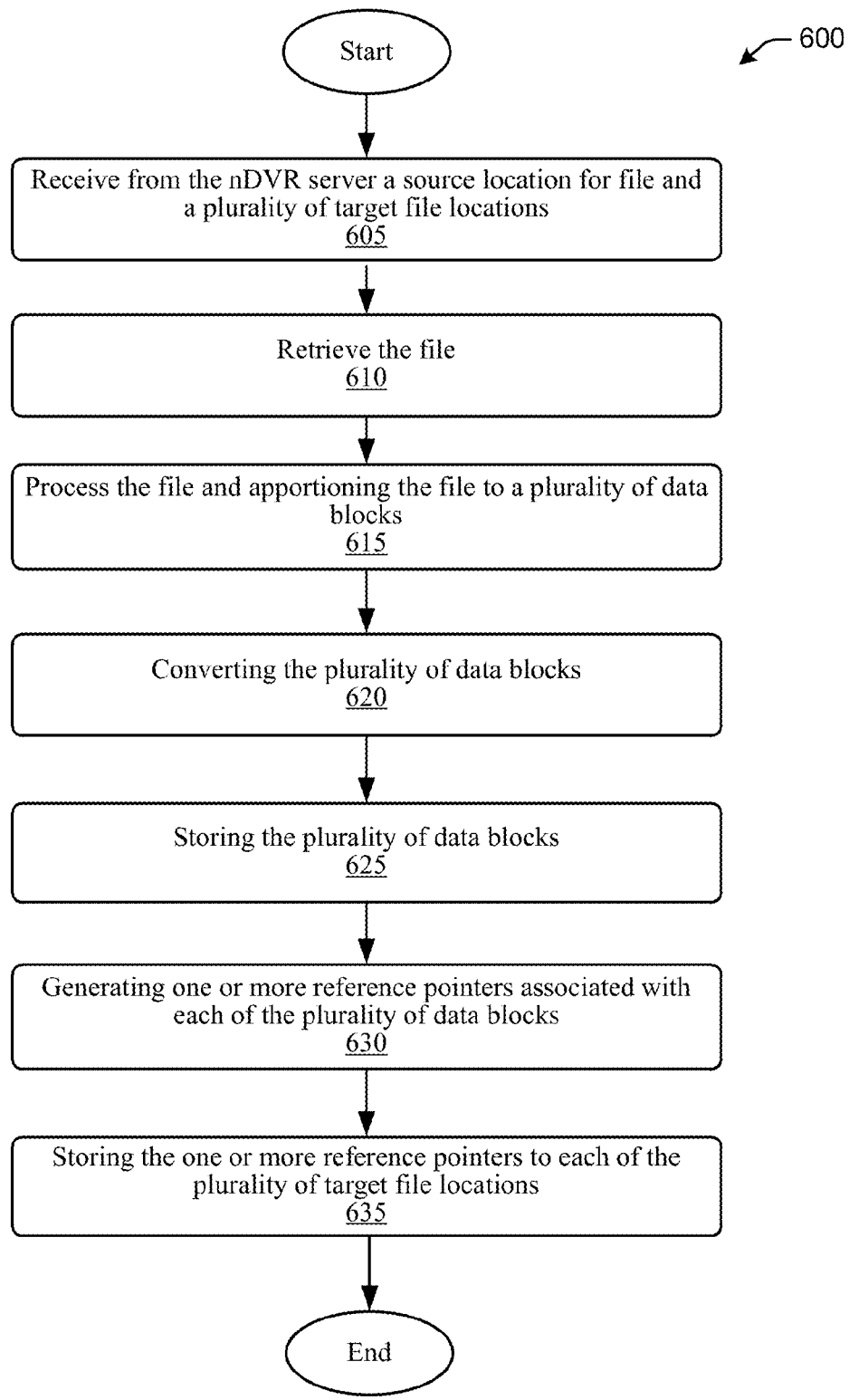
FIG. 6 is a flow diagram of a method for write-level optimization in an nDVR system, in accordance with an embodiment of the disclosure.

FIG. 6 is a flow diagram of a method 600 for write-level optimization in an nDVR system 100, in accordance with an embodiment of the disclosure. The method 600 for write-level optimization in an nDVR system 100 may be executed in response to a request to clone an asset to one or more target locations.

The nDVR application 186 may determine for each content asset source whether any scheduled or recording assets need to have files copied. The nDVR application 186 may check the nDVR server 112 for records and/or record events indicating a state of "scheduled" or "recording" for the source in question and generate a list of users and requested content assets (e.g., the target file name may be based on user, asset, source, and/or time). The nDVR application 186 may check the nDVR storage array 106 to determine assumed segment duration and destination characteristics. The nDVR application 186 may check to see if the last cloned files represent the completion of the asset, and if so, change the state to "recorded-qc." The nDVR application 186 may request the latest manifest file for the source, check the file modification time, and determine that all segments are in the manifest files during the duration from the last run based on the assumed segment duration. The nDVR application 186 may check segments against expected segment durations; if the durations are the same, only a single set of files should be identified in the previous step. If the assumed segment duration remains unchanged (e.g., the segment has not increased in duration), a re-check is "scheduled" based on the assumed segment duration. If the segment duration does not match, a quality control job may be scheduled to adjust the manifest files, and the states are changed to "scheduled-qc" or "recording-qc." The nDVR storage array 106 may be instructed to clone a file based on its network location to a list of target locations, for each file identified in the previous step. In some embodiments, the nDVR application 186 may sleep until the next segment is expected.

In some embodiments, when the content becomes (or is expected to become) available on the CDN 104, the nDVR application 186 may search the nDVR storage array 106 for all target locations and instruct the appropriate nDVR storage array(s) 106 to store the segments in all of the required locations.

In some embodiments, the nDVR storage array 106 may create one set of i-nodes and blocks and create multiple files using the referenced i-nodes in response to receiving instructions to clone an asset to one or more target locations. The nDVR storage array 106 may receive instructions to clone a file from a specified location on the network to a list of target locations. Each target location may be a distinct file, only available to the target/intended user. This reduces the number of write-cycles on the disk, enables the creation of an increased number of files given a specific write-cache (increasing the system throughput), and provides for storage optimization.

At block 605, the nDVR storage array 106 may receive from the nDVR server 112 a source location for a file associated with a content asset and a plurality of target file locations to clone or copy the file. At block 610, the nDVR storage array 106 may retrieve the file from the source location. At block 615, the retrieved file may be processed and apportioned to a plurality of data blocks. At block 620, the plurality of data blocks may be converted. In some embodiments, the conversion of the data blocks may include encoding the data blocks prior to storage at a target location. At block 625, the plurality of data blocks may be stored (e.g., in the nDVR storage array 106). At block 630, one or more reference pointers associated with the plurality of data blocks may be generated. At block 635, the one or more reference pointers to each of the plurality of data blocks for the file may be stored to each of the plurality of target file locations (e.g., a directory associated with a user account).

At block 605, the nDVR storage array 106 may receive from the nDVR server 112 a source location for a file associated with a content asset and a plurality of target file locations to clone or copy the file. In some embodiments, the nDVR storage array 106 may receive the source location and a plurality of target locations (e.g., list of locations) from the nDVR application 186. The plurality of target locations may be a list of source locations on the CDN 104 and/or the CAC 102. The plurality of target locations may be a list of source locations maintained by the nDVR application 186. The plurality of target locations may be a list of source locations generated and maintained by a process associated with the CDN 104 and/or the CAC 102. In some embodiments, the source location for a file associated with a content asset and the plurality of target locations may be received by the nDVR storage array 106 responsive to the nDVR server 112 receiving a request to schedule a recording for the identified content asset. In some embodiments, the nDVR storage array 106 may receive a request to or copy the identified file to the plurality of target locations generated by the nDVR application 186.

At block 610, the nDVR storage array 106 may retrieve the file from the source location. In some embodiments, the nDVR storage array 106 may obtain the file from the source location. In some embodiments, the nDVR storage array 106 may retrieve the file from the source location responsive to receiving the source location of the file. In some embodiments, the nDVR storage array 106 may generate a record event associated with receiving the source location of the file and/or the request to clone the identified file. A process associated with the nDVR application 186 may periodically scan the nDVR storage array 106 to determine if any identified files need to be retrieved from the identified source location. In some embodiments, the process associated with the nDVR application 186 may instruct the nDVR storage array 106 to retrieve any files associated with record events generated responsive to receiving a request to clone the identified file. Upon retrieval of the identified file from the source location, the nDVR storage array 106 may delete the record event associated with the retrieved file.

At block 615, the retrieved file may be processed and apportioned into a plurality of data blocks. In some embodiments, the processing of the retrieved file may include forward error correction (FEC) or channel coding. FEC is a technique used for controlling errors in data transmissions over unreliable or noisy communication channels. The sender of the information (e.g., source location) may encode the data in a redundant manner (e.g., using error-correcting code), which may permit the receiver to detect a limited number of errors that may have occurred anywhere in the message and may permit correction of these errors without retransmission of the data. FEC may permit the receiver to correct errors without needing a reverse channel to request retransmission of data, but at the cost of a fixed, higher forward channel bandwidth. FEC is therefore applied in situations where retransmissions are costly or impossible, such as one-way communication links and when transmitting to multiple receivers in multicast.

In some embodiments, the processing of the retrieved file may include partial response maximum likelihood processing (PRML). PRML is a method for converting the weak analog signal from the head of a magnetic disk or tape drive into a digital signal. PRML attempts to correctly interpret small changes in the analog signal. In some embodiments, the processing of the retrieved file may include processing associated with lossless compression file system.

Further, at block 615, the processed file may be apportioned into a plurality of data blocks. In some embodiments, i-nodes associated with the apportioned blocks may be created. I-nodes may be data structures that may store information about a file system object (e.g., metadata) and usually excludes data content and file name.

At block 620, the plurality of data blocks may be converted. In some embodiments, the conversion of the data blocks may include encoding the data blocks prior to storage at a target location. At block 625, the plurality of data blocks may be stored (e.g., in the nDVR storage array 106).

At block 630, one or more reference pointers associated with each of the plurality of data blocks may be generated. The one or more reference pointers may be generated based upon at least in part the i-nodes associated with apportioned data blocks.

At block 635, the one or more reference pointers associated with each of the plurality of data blocks associated with the file may be stored to each of the plurality of target file locations (e.g., a directory associated with a user account). In some embodiments, each of the one or more references pointers associated with each of the plurality of data blocks may be stored at one of the plurality of the target file locations.

In some embodiments, utilizing a single copy (e.g., stored data blocks) of an asset may reduce the write-commit demand and required storage capacity of the nDVR storage array 106. Additionally, a single copy is able to be cached in the network, whereas individual copies may increase the transport required between the nDVR storage array 106 and the one or more client devices 110 requesting the content asset. The nDVR system 110 may be able to support the ability to define, on a source-by-source or source-version-by-source-version basis, if the single copy is sufficient or if each user must have his or her own copy. The popularity of the source may warrant the creation of regional copies where a single copy is permitted. In some embodiments, a mix of single-copy, regional-copy, and user-specific copy within a single user recording may be supported. In some embodiments, the nDVR application 186 may instruct the nDVR storage array 106 to copy the requested content asset to the appropriate directories.

Figure 7:
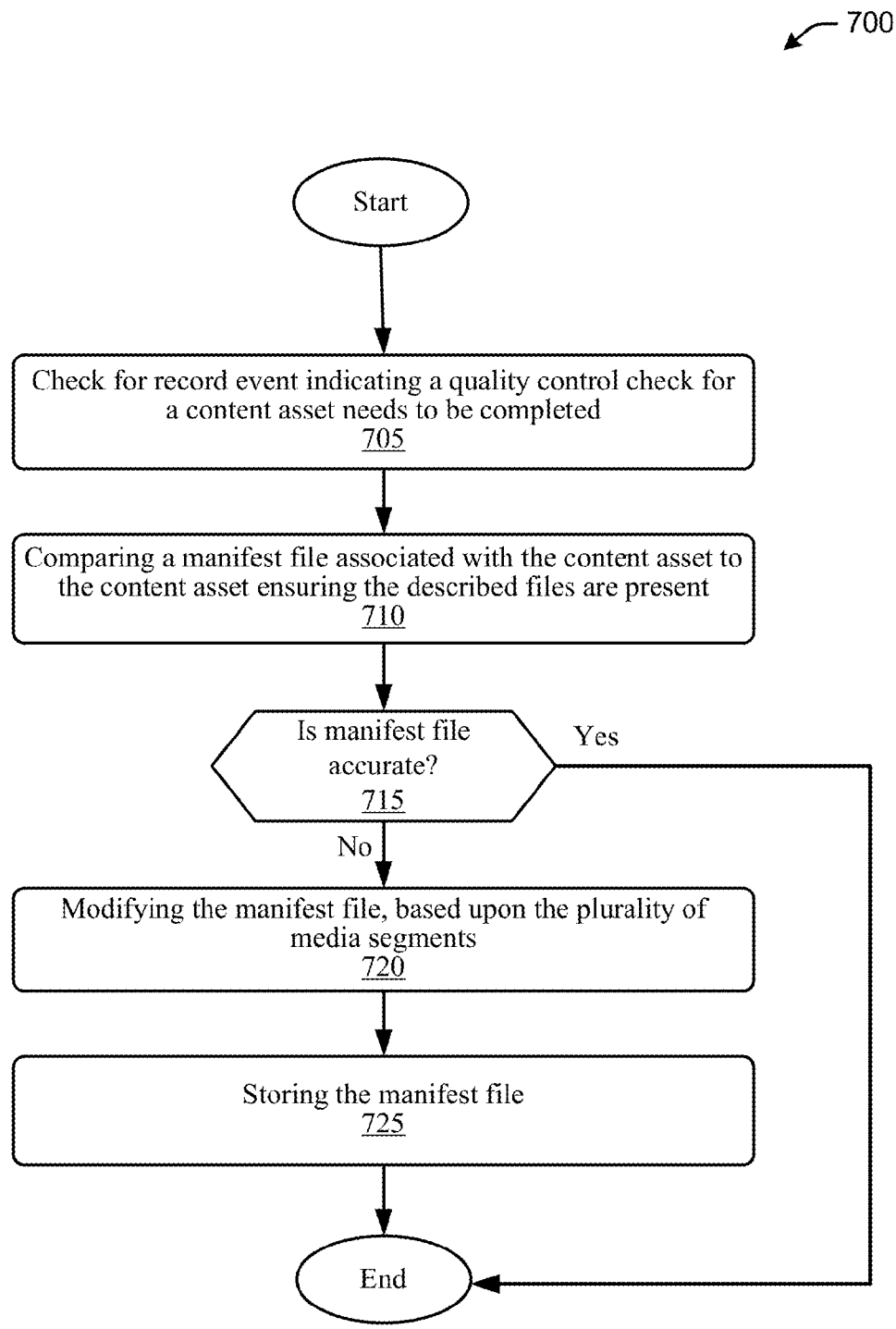
FIG. 7 is a flow diagram of a method for quality control checks in an nDVR system, in accordance with an embodiment of the disclosure.

FIG. 7 is a flow diagram of a method 700 for quality control checks in an nDVR system 100, in accordance with an embodiment of the disclosure. In some embodiments, the nDVR system 110 may perform a quality control check some time after the completion of the recording of the asset. In brief overview, at block 705, a process of the nDVR application 186 may check for a record event indicating a quality control check for a content asset needs to be completed. At block 710, a manifest file associated with the content asset may be compared with the content asset ensuring the media segment files stored in the manifest file as URIs are present and stored in the nDVR system 110. At block 715, the process determines whether the manifest file is accurate. If the manifest file is accurate, then the quality control check may be complete, and the record event associated with the quality control check may be deleted. If the manifest file is not accurate, then at block 720, the manifest file may be modified, based at least in part on the plurality of media segments of the content asset. At block 725, the modified manifest file may be stored, which may signal the completion of the quality control check. The record event associated with the quality control check may be deleted.

At block 705, a process associated with the nDVR application 186 may determine a quality control check may be required for a content asset. In some embodiments, a process associated with the nDVR application 186 may check the nDVR server 112, nDVR storage array 106, an nDVR database associated with the nDVR server 112, and/or another entity in the nDVR system 100 to identify one or more record events for quality control checks associated with one or more asset records. In some embodiments, the record events for quality control checks may be indicated as a state in the nDVR storage array 106 such as a "-qc."

In some embodiments, the process associated with the nDVR application 186 may check for one or more record events at predetermined time intervals. For example, the process may scan the nDVR server 112 or a database associated with the nDVR server 112 containing the records associated with scheduled recordings. The process may scan to identify one or more record events indicating a quality control check for a content asset needs to be completed. The process may scan or check for record events at predetermined time intervals, which in some embodiments, may be set by an administrator of the system 100. In some embodiments, the process associated with the nDVR application 186 may check for record events responsive to a triggering event (e.g., receiving an indication that a content asset has completed recording).

At block 710, a manifest file associated with the content asset may be compared with the content asset. The content asset, after broadcast, may be available as media segments. The process may identify the manifest file associated with the media segment files associated with the content asset. In some embodiments, if an entitlement check is scheduled for a future time and it is still within a pre-determined amount of time from the end of the airing of the content asset (e.g., one hour), an entitlement check or validation may be performed immediately. If the time exceeds the pre-determined amount of time, the entitlement of the user to access the content asset may be assumed, and the record event associated with the entitlement validation may be removed.

In some embodiments, the manifest file may be evaluated against the current assumed segment duration for a given source. If these are different, the manifest file may be rewritten, ensuring that segment durations for all existing segments are based on actuals, though putting "placeholders" for missing files.

At block 715, the process determines whether the manifest file is accurate. If the manifest file is accurate, then the quality control check is complete, and the record event associated with the quality control check is deleted. A state associated with the asset record for the content asset may be set as "recorded" indicating that the asset has been recorded.

If the manifest file is not accurate, then at block 720, the manifest file is modified, based at least in part on the plurality of media segments of the content asset. In some embodiments, media segments may be missing. If media segments for specific segments are missing, the manifest file may be modified to point to the next lower profile for the missing file or a lower profile present in the case of a segment at the lowest profile. If all files are missing for a specific segment of the content asset, a clip that exists on the network may be "inserted" into the stream that indicates that there was a quality control issue. For example, the clip may present the user with a message, such as "locating signal" or "locating file," and may remove the message at the point where the segment media files are present.

In some embodiments, depending on the number and type of modifications to the manifest file due to missing segment files, the content asset may be marked as "recorded-pristine" or "recorded-near pristine," "recorded-qh" (e.g., high quality, minor fixes), "recorded-qm" (e.g., medium quality, moderate number of modifications), or "recorded-ql" (e.g., low quality, numerous or significant modifications to the manifest file). In some embodiments, record assets marked as "recorded-qm" or "recorded-ql" may result in the creation of a record event for rescheduling the recording and may store the record event in association with the asset record for content assets in an nDVR database. A process associated with the nDVR application 186 may identify all record events for rescheduling the recording in the nDVR storage array 106 and invoke one or more rescheduling algorithms.

At block 725, the modified manifest file may be stored, which may signal the completion of the quality control check. The record event associated with the quality control check may be deleted.

In some embodiments, trick-mode file generation may occur as part of the quality control check. In some embodiments, the trick-mode file generation may occur after the completion of the quality control check. As described above, the trick-mode is a feature of digital video systems that mimics the visual feedback given during fast-forward and rewind operations that were provided, by analog systems such as VCRs by manipulating the video stream to include only a subset of frames. The trick-mode file generation may be based at least in part on thumbnail files generated from the media segments. The thumbnail files and/or images associated with the media segment may be generated when an instantaneous decoding refresh (IDR) frame at the beginning of each media segment is converted to a thumbnail representing that media segment. In some embodiments, the process may use the media segment with the lowest resolution to generate the thumbnail. In the case of 15-second media segments, the user may "walk" forward or backward in increments of 15 seconds for the content asset. The thumbnails associated with each media segment may be stored in association with the manifest file and links or URIs associated with the thumbnails may be stored in the manifest file. By creating thumbnail files from the IDR frame, the nDVR application 186 may not need to have additional transcoding or further processing.

Figure 8:
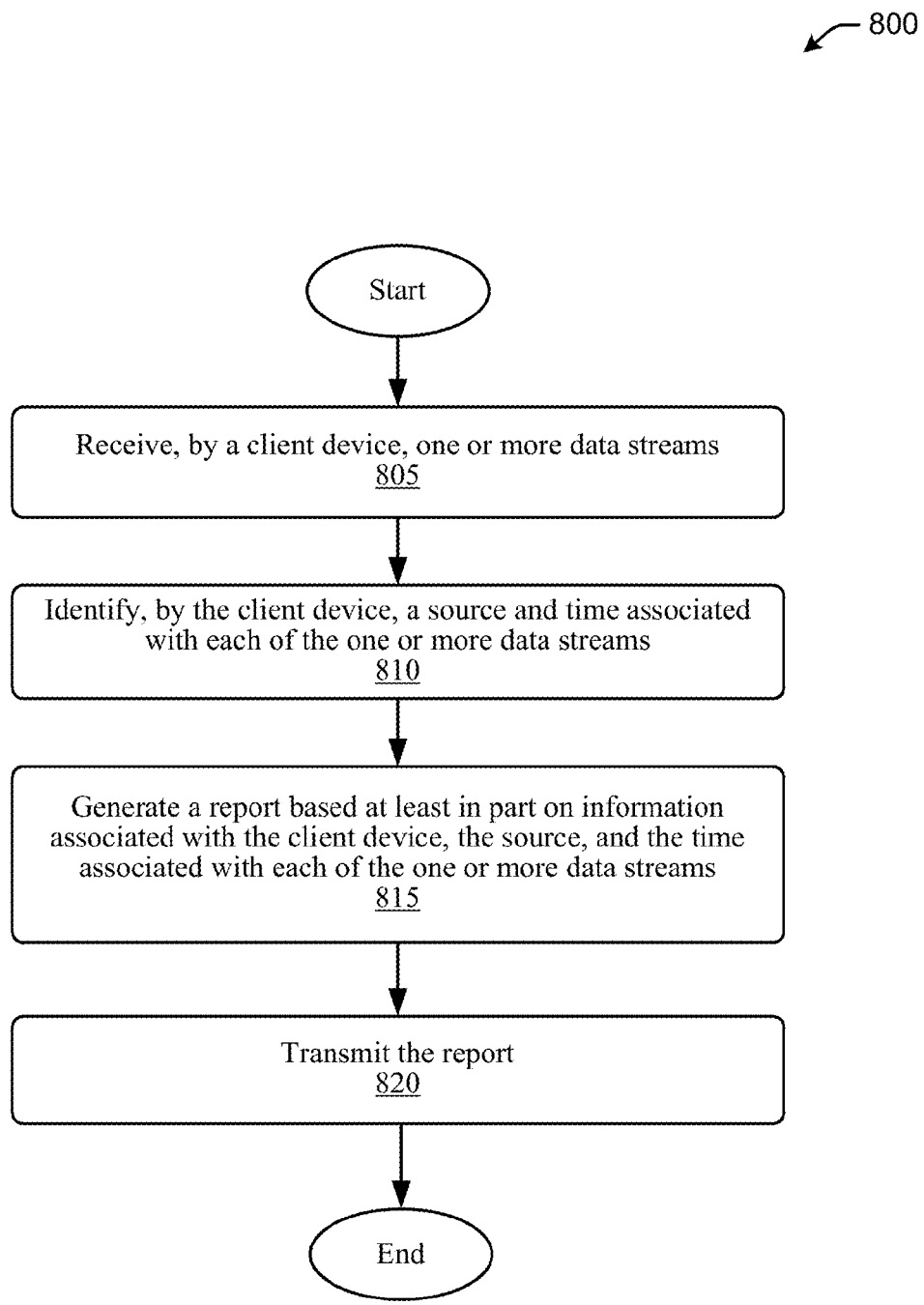
FIG. 8 is a flow diagram of a method for bookmarking and metering assets in an nDVR system, in accordance with an embodiment of the disclosure.

FIG. 8 is a flow diagram of a method 800 for asset metering in an nDVR system 100, in accordance with an embodiment of the disclosure. In some embodiments, asset metering may be the periodic notification by the client device 110 to the nDVR server 112 of the consumption of activity associated with the client device 110 with respect to a given asset and associated time or segment displayed. Asset metering may be used to generate a record of how much of an asset is consumed. In some embodiments, asset metering may be used to understand what parts of an asset are of more or less interest to a consumer. In some embodiments, asset metering may be used for the creation of bookmarks (e.g., last media segment consumed by the client device 110) to enable the customer or user of the client device 110 to resume playing at a different time and/or on a different device.

At block 805, a client device 110 may receive one or more data streams. At block 810, the client device 110 may identify a source and time associated with each of the one or more data streams. At block 815, the client device 110 may generate a report for asset metering and/or bookmarking based at least in part on information associated with the client device 110, the source, and the time associated with each of the one or more data streams. In some embodiments, the report may comprise information indicating the viewership status for the identified source at the identified time associated with the data streams. At block 820, the generated report may be transmitted by the client device 110 to the nDVR system 110.

In some embodiments, the nDVR application 186 may create and/or use "bookmarks," which may be created in the asset directory or in the nDVR storage array 106, or both. Multiple bookmarks may exist for each asset. In some embodiments, one or more data streams may be transmitted to a client device 110. One or more time stamps associated with one or more portions of the data streams may be received. One or more records may be generated based at least in part on the time stamps. One or more records may be stored.

In some embodiments, one or more data streams may be transmitted to a client device 110. In some embodiments, the one or more data streams may be transmitted to one or more client devices 110. The data streams may be transmitted responsive to a request for a content asset. In some embodiments, multiple data streams associated with different content assets may be transmitted to the client device 110 (e.g., picture-in-picture feature).

One or more time stamps associated with one or more portions of the data streams may be received. In some embodiments, a user may indicate that he or she would like to bookmark a content asset at a particular time. The user may indicate the desire to bookmark the asset using the client device 110. In some embodiments, time stamps associated with the content asset may be received responsive to a dropped connection with the client device 110 or an indication that an application executing on the client device 110 has stopped.

In some embodiments, one or more records may be generated. One or more records associated with the asset record for the content asset may be generated based at least in part on the received time stamps. In some embodiments, the one or more records may be stored. In some embodiments, the records may be stored in the nDVR storage array 106 in association with the asset record. In some embodiments, the one or more records may be stored locally on the client device 110. In some embodiments, one time stamp may be associated with one client device 110 (e.g., a laptop) while a second time stamp may be associated with a different client device 110 (e.g., a smartphone).

In some embodiments, when content assets are stored in association with a user account, a value may be assigned to the content as it relates to the quota associated with the user account. The value may be based on size, duration, duration blocks (e.g., a 62-minute recording may be counted as two 30-minute blocks), type (e.g., standard definition, high definition) or any combination thereof, and rules may be applied on a per-user basis resulting from the subscription options. If a user exceeds his or her quota, a requested recording of a content asset may still be completed but access to the content may require upgrading to a higher level of quota. In some embodiments, if a user is approaching his or her maximum quota, the nDVR storage array 106 or nDVR server 112 may generate a notification to the one or more client devices 110 associated with the user account. In some embodiments, the notification may comprise an indication of the current usage, the maximum quota, the upgrade options, and/or a listing of the content assets. In some embodiments, the notification may contain a link or button to the user account to allow the user to directly make changes in association with the quota (e.g., delete assets, upgrade subscription, or the like).

In some embodiments, duration blocks for each version of each source may be defined as a unique asset. For example, duration blocks may be defined as one-hour or four-hour blocks. Security keys may rotate for each source on the one-hour or four-hour boundaries. Assets may span multiple key boundaries, especially for pre- and post-content (e.g., assets starting early or ending late). Based on the deterministic naming schema described herein, the name of the file may be used to determine an asset identifier associated with the file and the digital rights management (DRM) system to determine the correct keys to embed in the DRM license.

In some embodiments, a user may create "smart lists" or "user channels" based at least in part on the user's recorded content. For example, a smart list or user channel may be a user-created playlist of recorded assets associated with a user account. For example, if a user has recorded many episodes of a popular children's show, the user may create a smart list by adding one or more recorded assets associated with a user account. In some embodiments, users may share their smart lists with other users. However, the other users will only be able to play the smart list if they also have recorded the same assets. For example, if Adam creates a smart list of a week of a children's program, he may send the smart list to Bob. Bob also has the same content recorded, and Bob's client device 110 may play the assets in the order designated by Adam's smart list.

In some embodiments, the nDVR system 100 may provide the functionality to retrieve a catalog of assets. The client device 110 may send a request to the nDVR server 112. The nDVR server 112 may transmits a list of all content assets associated with the client device 110 and their respective states (e.g., scheduled for recording, recorded, etc.) In some embodiments, the catalog of assets may include a list of deleted content assets that may be undeleted and a time frame when the un-deletion must occur. The nDVR server 112 may also transmit quota information associated with the client device 110 and/or the user account associated with the client device 110. In some embodiments, the client device 110 may translate the various states into user-friendly language. In some embodiments, the nDVR server 112 may translate and transmit the information responsive to receiving the request from the client device 110. The translation of the various states associated with the content records, whether performed by the nDVR server 112 or the client device 110, may present the user with a richer user experience.

Similarly, managed assets may give the user the ability create priority-setting rules for deletion of content and co-existence of multiple quota management systems may be enabled. In some embodiments, content assets may be deleted by the date the content asset was recorded, the size of the content asset, the rating associated with the content asset, the sub-user who requested the recording of the content asset, and other metadata associated with the content asset.

In some embodiments, if users had different quotas for different content providers, content may be shared across both but only counted towards one of the given quotas. For example, if a user subscribed to Content Provider A and Content Provider B, they may be able to access the content from Content Provider A through Content Provider B without affecting the quota associated with Content Provider B. In some embodiments, if the user has different quotas for the different content providers, the nDVR application 186 may generate a notification confirming a user's request and notifying them of the effect on their quota prior to completing the action.

In some embodiments, the nDVR system 100 may provide the functionality to convert recordings to other personal archive mediums, including storage on a network-based rights locker or conversion to a physical medium (e.g., DVD). For example, when viewing a recorded asset, the nDVR client 166 may provide a button or hyperlink to an option to convert the recording to a particular archival medium. In some embodiments, users may be presented the option to convert the recordings into a web-accessible user account.

Figure 9:
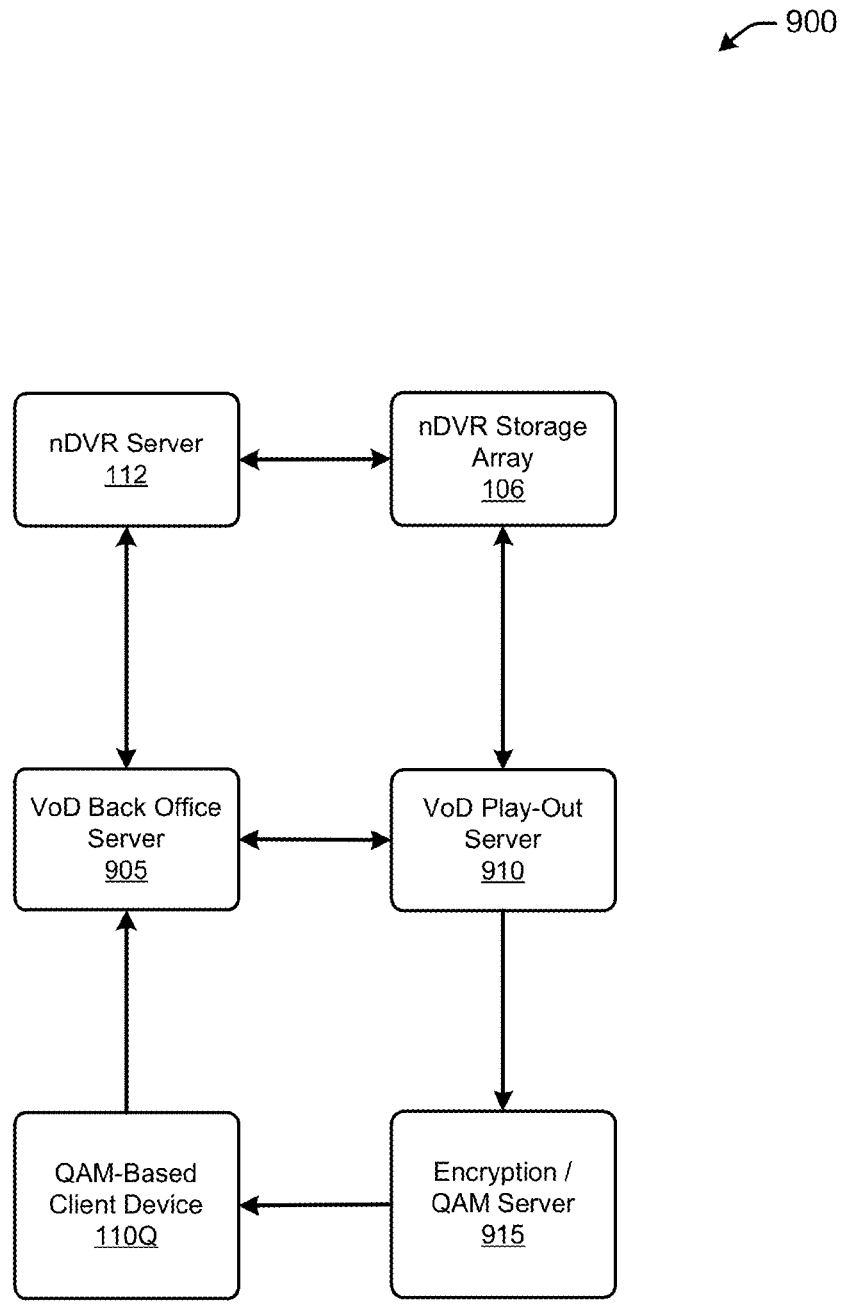
FIG. 9 is a block diagram of a system for providing nDVR services to a legacy system, in accordance with an embodiment of the disclosure.

FIG. 9 is a block diagram of a system 900 for providing nDVR services to a legacy system, in accordance with an embodiment of the disclosure. Quadrature amplitude modulation (QAM) is a format by which digital channels are encoded and transmitted via cable television providers. In some embodiments, a server-based virtual client may retrieve the appropriate bit-rate segments, decrypt, and stream out transport streams to the legacy QAM-based video-on-demand (VoD) platform. In some embodiments, the server-based virtual client may convert the stream to the format needed for the legacy devices (decryption, concatenation) and stream it to the legacy device.

Legacy systems may include systems that utilize a QAM transmission protocol to deliver content to a client device 110. QAM signals may be carried over any variety of communicative links, such as coaxial cables, fiber optic cables, and/or hybrid fiber and coaxial (HFC) cables and may not be directly compatible with an Internet protocol based system. Certain embodiments, as disclosed herein, may include a system 900 for providing nDVR service to legacy systems such as those utilizing QAM-based client devices.

In some embodiments, a VoD back office server 905 (e.g., a server-based virtual client) may receive a request for content on behalf of a QAM-based client device 110Q. The VoD back office server 905 may transmit the request to the nDVR server 112. The nDVR server 112 may communicate with the nDVR storage array 106 to retrieve the appropriate bit-rate segments. The VoD play-out server 910 may receive the request from the VoD back office server 905 and receive the appropriate bit-rate segments from the nDVR storage array 106 and decrypt, concatenate, and/or transcode the bit-rate segments to generate a transport stream (e.g., MPEG-2). The generated transport stream may be transmitted to the encryption/QAM server 915 to encrypt the transport stream and transmission to the requesting QAM-based client device 110Q. In some embodiments, the VoD back office server 905 may present nDVR content to the QAM-based client device 110Q (e.g., video-on-demand assets in a "Your Recordings" folder).

Within the system 900 for providing nDVR services to legacy devices, one or more servers may be utilized. For convenience in description, and not by way of limitation, separate servers are described. However, it is understood that in some implementations the various functions provided by the servers may be merged, separated, and so forth. Furthermore, the servers may intercommunicate or otherwise interact with one another, such that the conditions of one affect the operation of another.

Figure 10:
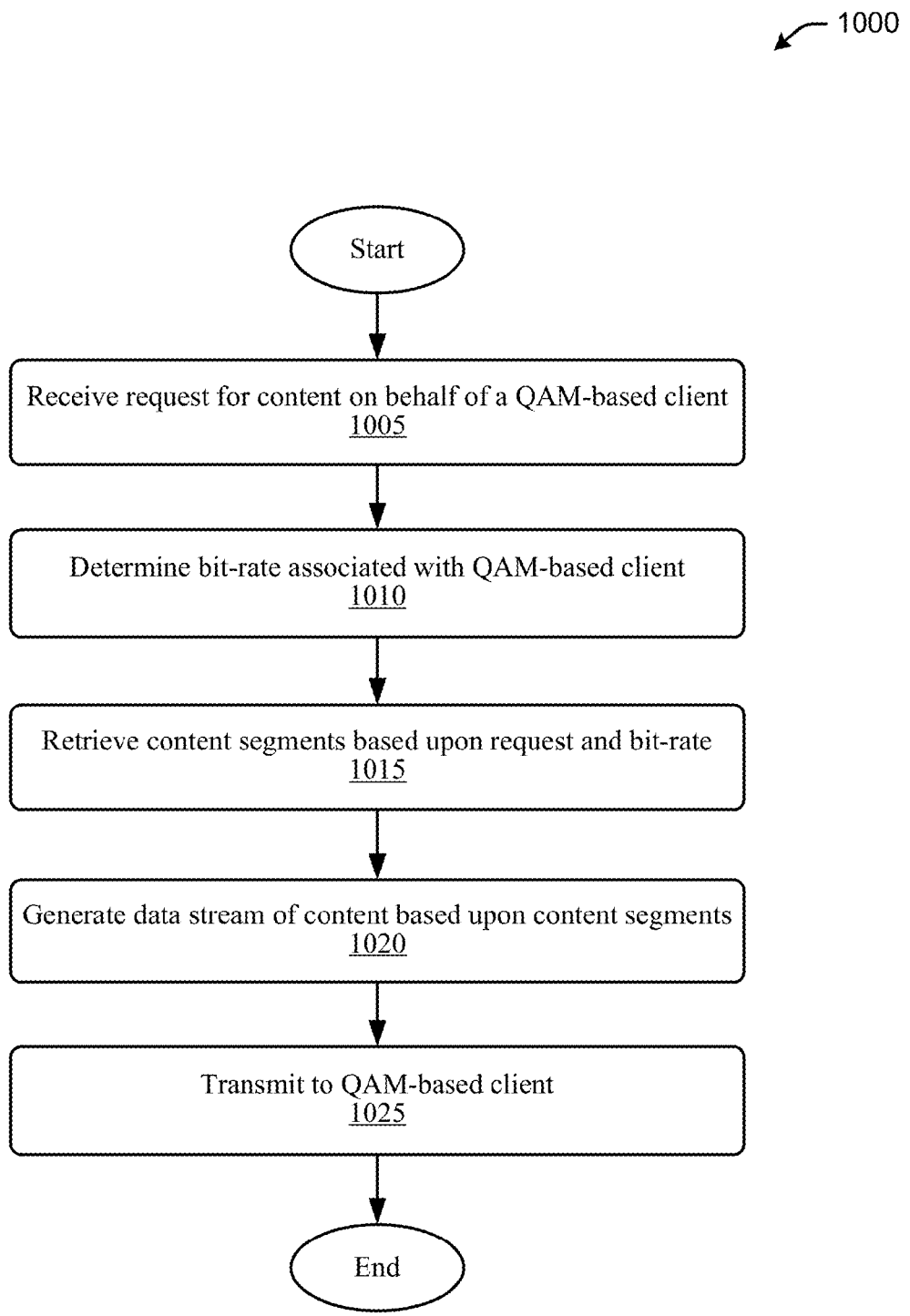
FIG. 10 is a flow diagram of a method for providing nDVR services to a legacy system, in accordance with an embodiment of the disclosure.

FIG. 10 is a flow diagram of a method 1000 for providing nDVR services to a legacy system such as a QAM-based system. At block 1005, a request for content may be received on behalf of a QAM-based client device 110Q. At block 1010, a bit-rate associated with the QAM-based client device 110Q may be determined. At block 1015, content segments for the requested content may be retrieved based at least in part on the request and determined bit-rate. At block 1020, a data stream of content may be generated based at least in part on the content segments. At block 1025, the generated data stream may be transmitted to the QAM-based client 110Q.

At block 1005, a request for content may be received on behalf of a QAM-based client device 110Q. In some embodiments, the VoD back office server 905 may receive a request for content on behalf of the QAM-based client device 110Q. In some embodiments, the VoD back office server 905 may receive the request in response to presenting the user of the QAM-based client device 110Q with nDVR content available for playback. For example, the VoD back office server 905 may retrieve or otherwise obtain data associated with the user account associated with the QAM-based client device 110Q. The VoD back office server 905 may communicate with the nDVR server 112 or the nDVR storage array 106 to identify any recorded content that may be available to the user and present the information to the user. In some embodiments, the presented information may comprise a button or hyperlink that may generate a request for the content if selected by the user of the QAM-based client device 110Q.

At block 1010, a bit-rate associated with the QAM-based client device 110Q may be determined. In some embodiments, the VoD back office server 905 may, based at least in part on the request, determine a bit-rate associated with the QAM-based client device 110Q. In some embodiments, the VoD back office server 905 may determine that the QAM-based client device 110Q may only play content below a pre-determined threshold. In some embodiments, the request may comprise a bit-rate associated with the QAM-based client device 110Q. In some embodiments, the VoD back office server 905 may determine, based at least in part on the type of QAM-based client device 110Q, one or more bit-rates associated with the client device 110Q.

In some embodiments, the VoD back office server 905 may generate a request for content segments. In some embodiments, the VoD back office server 905 may appear to the nDVR as a client device 110. The VoD back office server 905 may generate a request for content based at least in part on the determined bit-rate associated with the QAM-based client device 110Q.

At block 1015, content segments for the requested content may be retrieved or otherwise obtained based at least in part on the request and determined bit-rate. In some embodiments, the nDVR server 112 may receive the request from the VoD back office server 905. The nDVR server 112 may, as described above, communicate with the nDVR storage array 106 to determine if a user account associated with the QAM-based client device 110Q exists. If the user account exists, the nDVR server 112 may communicate with the nDVR storage array 106 to retrieve the requested content segments for the determined bit-rate associated with the QAM-based client device 110Q.

At block 1020, a data stream of content may be generated based at least in part on the content segments. The VoD play-out server 910 may receive the content segments from the nDVR storage array 106. In some embodiments, the VoD play-out server 910 may have received a notification based at least in part on the request received by the VoD back office server 905 from the QAM-based client device 110Q. The VoD play-out server 910 may have initiated generation of a transport stream responsive to receiving the notification from the VoD back office server 905. In some embodiments, the VoD play-out server 910 may receive the content segments from the nDVR storage array 106 and generate one or more transport streams of the requested content. In some embodiments, the VoD play-out server 910 may decrypt the received content segments. The VoD play-out server 910 may concatenate or otherwise assemble the content segments.

In some embodiments, the one or more generated data streams may be transmitted to an encryption/QAM server 915. The encryption/QAM server 915 may transcode the generated one or more transport streams as necessary. In some embodiments, the generated transport streams may need to be transcoded to the QAM transmission protocol to be compatible with the QAM-based client device 110Q.

At block 1025, the one or more generated data streams may be transmitted to the QAM-based client 110Q. In some embodiments, the one or more generated data streams may be transmitted to the QAM-based client 110Q over one or more networks 108 as described above.

Similar to the descriptions associated with FIG. 10, the system 900 for providing nDVR services to QAM-based client devices 110Q may also provide the ability to schedule, record, delete, and otherwise manage assets in the nDVR system.

As will be appreciated by one skilled in the art, the present disclosure may be embodied as a system, method, or computer program product. Accordingly, the present disclosure may take the form of an entirely hardware embodiment, an entirely software embodiment (including firmware, resident software, micro-code, etc.), or an embodiment combining hardware and software aspects that may all generally be referred to herein as a "circuit," "a module" or "a system." Furthermore, the present disclosure may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, because the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium including, but not limited to, the Internet, wireline, optical fiber cable, RF, etc.

Computer program code for carrying out operations of the present disclosure may be written in an object-oriented programming language such as Java, Smalltalk, C++, or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flow diagram and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flow diagram and/or block diagram block or blocks.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
    receiving, by a network-based digital video recording (nDVR) system comprising one or more computers, a request to copy a file to a plurality of locations;
    associating, by the nDVR system, a dynamically adjustable quota to a user account based at least in part on a user subscription;
    sending, by the nDVR system, a notification upon determining the quota has reached a threshold;
    processing, by the nDVR system, the file, wherein the processing comprises apportioning the file into a plurality of data blocks;
    periodically scanning, by the nDVR system, at least one of the plurality of data blocks to determine if the at least one of the plurality of data blocks is to be deleted;
    storing, by the nDVR system, the plurality of data blocks to a location;
    generating, by the nDVR system, a plurality of reference pointers associated with each of the plurality of data blocks; and
    storing, by the nDVR system, the plurality of reference pointers;
    wherein storing the plurality of reference pointers comprises storing the plurality of reference pointers to the plurality of locations, wherein at least one of the plurality of location is associated with a user account.

2. The computer-implemented method of claim 1, wherein the request to copy the file comprises a source location of the file.

3. The computer-implemented method of claim 2, further comprising:
    retrieving, by the nDVR system, the file from the source location.

4. The computer-implemented method of claim 1, wherein processing the file comprises at least one of forward error correction or partial response maximum likelihood (PRML) processing.

5. The computer-implemented method of claim 1, further comprising:
    generating, by the nDVR system, an i-node for each of the plurality of data blocks.

6. The computer-implemented method of claim 5, wherein generating the plurality of reference pointers is based at least in part on the i-node.

7. The computer-implemented method of claim 1, further comprising:
    encoding, by the nDVR system, each of the plurality of data blocks.

8. The computer-implemented method of claim 1, further comprising:

generating, by nDVR system, a record event based at least in part on the received request.

9. The computer-implemented method of claim 8, further comprising:
removing, by the nDVR system, the record event based at least in part on storing the plurality of reference pointers.

10. The method of claim 1, further includes:
associating, by the nDVR system, based at least in part on the quota, a value to the file; and
storing, by the nDVR system, the plurality of reference pointers based on the assigned value.

11. A system comprising:
at least one memory storing computer-executable instructions; and
at least one processor, wherein the at least one processor is configured to access the at least one memory and to execute the computer-executable instructions to:
receive a request to copy a file to a plurality of locations;
associate a dynamically adjustable quota to a user account based at least in part on a user subscription;
send a notification upon determining the quota has reached a threshold;
process the file, wherein the processing comprises apportioning the file into a plurality of data blocks;
periodically scan at least one of the plurality of data blocks to determine if the at least one of the plurality of data blocks is to be deleted;
store the plurality of data blocks to a location;
generate a plurality of reference pointers associated with each of the plurality of data blocks; and
store the plurality of reference pointers;
wherein storing the plurality of reference pointers comprises storing the plurality of reference pointers to the plurality of locations, wherein at least one location is associated with a user account.

12. The system of claim 11, wherein the request to copy the file comprises a source location of the file.

13. The system of claim 12, wherein the at least one processor is further configured to execute the computer-executable instructions to:
retrieve the file from the source location.

14. The system of claim 11, wherein processing the file comprises at least one of forward error correction or partial response maximum likelihood (PRML) processing.

15. The system of claim 11, wherein the at least one processor is further configured to execute the computer-executable instructions to:
generate an i-node for each of the plurality of data blocks.

16. The system of claim 15, wherein generating the plurality of reference pointers is based at least in part on the i-node.

17. The system of claim 11, wherein the at least one processor is further configured to execute the computer-executable instructions to:
encode each of the plurality of data blocks.

18. The system of claim 11, wherein the at least one processor is further configured to execute the computer-executable instructions to:
generate a record event based at least in part on the received request.

19. The system of claim 18, wherein the at least one processor is further configured to execute the computer-executable instructions to:
remove the record event based at least in part on storing the plurality of reference pointers.

20. the system of claim 11, wherein the at least one processor is further configured to execute the computer-executable instructions to:
associate, based at least in part on the quota, a value to the file; and
store the plurality of reference pointers based on the assigned value.

* * * * *